United States Patent
Ono et al.

(10) Patent No.: US 9,568,608 B2
(45) Date of Patent: Feb. 14, 2017

(54) PERIPHERAL OBJECT DETECTION SYSTEM AND HAULAGE VEHICLE

(71) Applicant: Hitachi Construction Machinery Co., Ltd., Tokyo (JP)

(72) Inventors: Yukihiko Ono, Tokyo (JP); Hidefumi Ishimoto, Tsuchiura (JP); Koji Fujita, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/729,404

(22) Filed: Jun. 3, 2015

(65) Prior Publication Data
US 2015/0355333 A1    Dec. 10, 2015

(30) Foreign Application Priority Data

Jun. 4, 2014    (JP) .................... 2014-116017

(51) Int. Cl.
| | |
|---|---|
| *G01C 3/08* | (2006.01) |
| *G01S 17/93* | (2006.01) |
| *G01S 7/481* | (2006.01) |
| *G01S 7/497* | (2006.01) |

(52) U.S. Cl.
CPC ............ *G01S 17/936* (2013.01); *G01S 7/4813* (2013.01); *G01S 7/4972* (2013.01)

(58) Field of Classification Search
CPC ..... G01S 17/936; G01S 7/4813; G01S 7/4972
See application file for complete search history.

(56) References Cited

U.S. PATENT DOCUMENTS

| | | | |
|---|---|---|---|
| 2003/0037124 A1* | 2/2003 | Yamaura ........... | G06F 17/30749 709/219 |
| 2003/0039124 A1* | 2/2003 | Tawa ...................... | B60Q 1/10 362/464 |
| 2005/0073437 A1* | 4/2005 | Perri ...................... | G08G 1/005 340/944 |
| 2005/0275512 A1* | 12/2005 | Shimoyama ........... | B60Q 9/005 340/435 |
| 2007/0198188 A1* | 8/2007 | Leineweber ........ | B60W 30/143 701/300 |

(Continued)

FOREIGN PATENT DOCUMENTS

JP    2009-175932 A    8/2009

*Primary Examiner* — Luke Ratcliffe
*Assistant Examiner* — Samantha K Abraham
(74) *Attorney, Agent, or Firm* — Mattingly & Malur, PC

(57) ABSTRACT

Disclosed is a peripheral object detection system to be mounted on a vehicle. The peripheral object detection system includes a peripheral information acquisition device and a detecting range switching mechanism. The peripheral information acquisition device is configured to have, as a detected range, apart of a peripheral space of the vehicle and to acquire distance information to an object that exists in the detected range and is to be detected. The detecting range switching mechanism is configured to switch, toward an area forward or backward of the vehicle, a direction of a detecting range of the peripheral information acquisition device based on forward/backward information that indicates whether the vehicle is moving in a forward direction or in a reverse direction.

3 Claims, 22 Drawing Sheets

(56) References Cited

U.S. PATENT DOCUMENTS

| | | | |
|---|---|---|---|
| 2010/0228419 A1* | 9/2010 | Lee | B60W 30/0953 |
| | | | 701/25 |
| 2011/0115615 A1* | 5/2011 | Luo | B60R 1/00 |
| | | | 340/436 |
| 2015/0178884 A1* | 6/2015 | Scholl | G06T 3/0018 |
| | | | 348/36 |
| 2015/0227952 A1* | 8/2015 | Dance | G06Q 10/04 |
| | | | 705/7.31 |

* cited by examiner

ROTATION ANGLE θ
0 < θ ≦ 90
⟨FORWARD MONITORING STATE⟩

ROTATION ANGLE
θ = 0
⟨REARWARD MONITORING STATE⟩

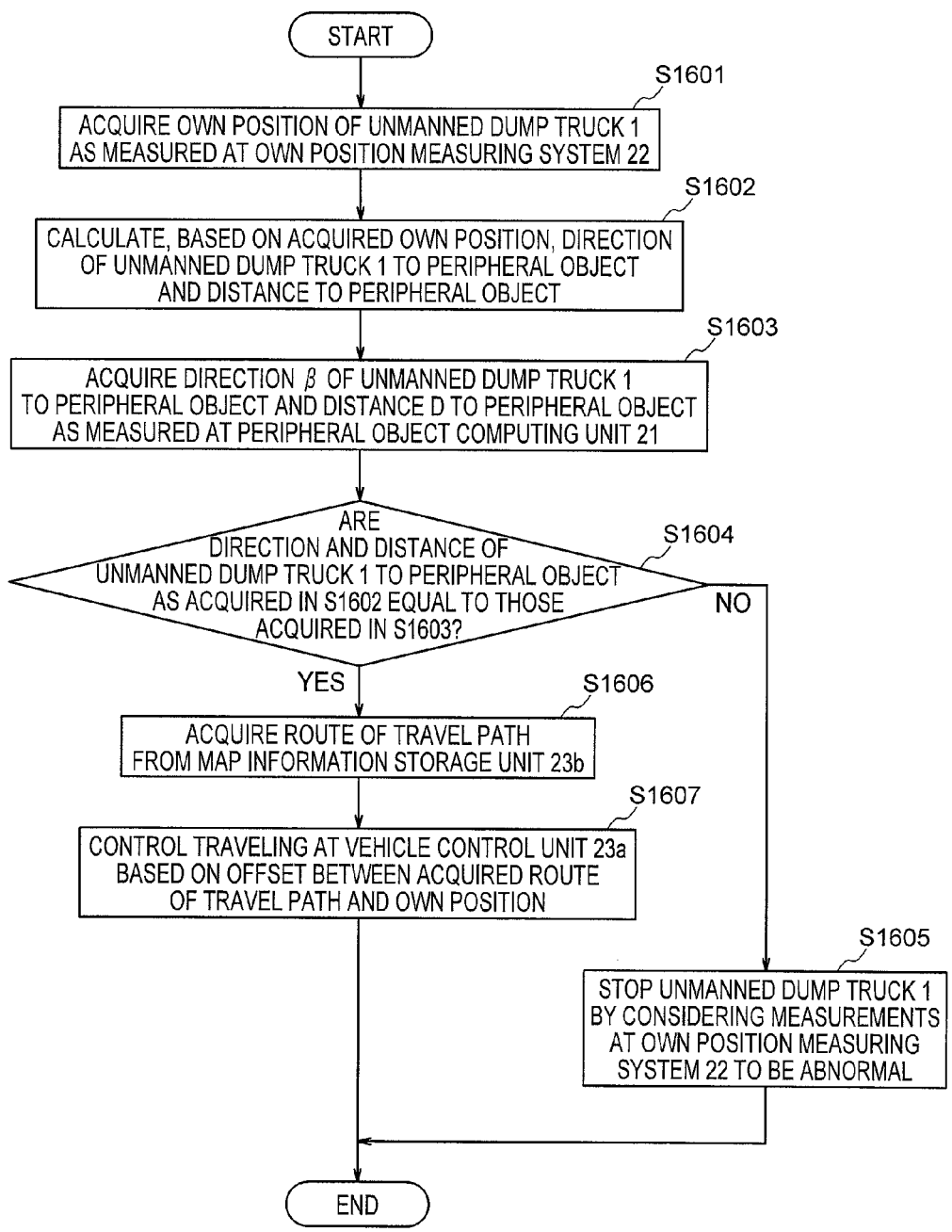

PERIPHERAL OBJECT DETECTION SYSTEM AND HAULAGE VEHICLE

CROSS-REFERENCE TO RELATED APPLICATION

This application claims the priority of Japanese Patent Application 2014-116017 filed Jun. 4, 2014, which is incorporated herein by reference.

BACKGROUND OF THE INVENTION

1. Field of the Invention

This invention relates to a peripheral object detection system and a haulage vehicle, and especially to a technology that makes it possible to reduce the number of parts and components used in peripheral monitoring surroundings of such a haulage vehicle.

2. Description of the Related Art

In so-called open-pit mining that rock and ore are excavated and delivered at the bottom of a mine, each haulage vehicle (hereinafter called "dump truck") repeats operation that upon completion of loading of excavated rock, it hauls the excavated rock from the excavation site to a dumping site and dumps the excavated rock there, and travels back again to the excavation site. The haulage rate per unit time of rock, which is hauled by each dump truck, is a matter linked directly to the progress of excavation so that the haulage of rock requires each dump truck to travel at high speed. To efficiently haul rocks in bulk out of the excavation site, a plurality of dump trucks travel back and forth many times between the excavation site and the dumping site along a haulage road. It is, accordingly, important to take preventive measures for collision accidents between on-going and on-coming dump trucks themselves.

In excavation work at mines, there is also an outstanding demand for unmanned haulage vehicles (hereinafter called "unmanned dump trucks"), which can perform autonomous traveling without operators on board, with a view to achieving improved safety and lowered mining costs.

As a technology for allowing an unmanned mobile object to perform autonomous traveling, JP2009-175932A is known. This patent document discloses a configuration that forward profile data are acquired as data in a sensor coordinate system by a laser range finder and that based on geometric feature values of data obtained by converting the first-mentioned data from the sensor coordinate system into an orthogonal coordinate system and those of prior data acquired beforehand, a region on a forward side is processed and divided into a travelable area and an untravelable area.

An unmanned dump truck that travels in a mine travels in reverse upon dumping at a dumping site. Measures are, therefore, also important for conforming the area backward of the unmanned dump truck during its backward traveling. In this respect, nothing is taken into consideration in JP2009-175932A. Further, any attempt to apply the technology of JP2009-175932A as a technology for confirming areas forward and backward of the unmanned dump truck requires laser range finders for the confirmation of the areas forward and backward of the unmanned dump truck, so that the problem of higher manufacturing costs for such unmanned dump trucks remains unsolved. Even with a manned haulage vehicle (hereinafter called "the manned dump truck") that travels with an operator onboard, a blind spot is formed in each of forward and backward fields of view. Therefore, the above-described problem also arises in the manned dump truck in much the same way as in the unmanned dump truck.

With the above-described problems in view, the present invention has as objects thereof the provision of a peripheral object detection system, which can perform at lower costs the detection of objects existing in forward and backward peripheries of a vehicle, and a haulage vehicle with the peripheral object detection system mounted thereon.

SUMMARY OF THE INVENTION

In one aspect of the present invention, there is hence provided a peripheral object detection system to be mounted on a vehicle. The peripheral object detection system comprises a peripheral information acquisition device and a detecting range switching mechanism. The peripheral information acquisition device is configured to have, as a detected range, a part of a peripheral space of the vehicle and to acquire distance information to an object that exists in the detected range and is to be detected. The detecting range switching mechanism is configured to switch, toward an area forward or backward of the vehicle, a direction of a detecting, range of the peripheral information acquisition device based on forward/backward information that indicates whether the vehicle is moving in a forward direction or in a reverse direction.

According to the one aspect of the present invention, the direction of the detecting range of the peripheral information acquisition device is switched according to the forward/backward information on the vehicle. With the single peripheral information acquisition device, it is, therefore, possible to perform forward and backward monitoring of the vehicle, specifically the measurement of distances to objects that exist in areas forward and backward of the vehicle, respectively, and are to be detected. Compared with the case in which forward and backward peripheral information acquisition devices are provided, the number of parts and components can be decreased accordingly. As is appreciated from the foregoing, the present invention can realize, in the one aspect thereof, forward and backward monitoring of the vehicle at low costs by monitoring forward when the monitoring of the area forward of the vehicle is needed and by monitoring backward when the monitoring of the area backward of the vehicle is needed.

In the configuration of the present invention as described above, the detecting range switching mechanism may include a drive device configured to move the peripheral information acquisition device such that the peripheral information acquisition device assumes a position where the detecting range is directed to detect the forward area or another position where the detecting range is directed to detect the backward area, and a control unit for driving and controlling the drive device based on the forward/backward information.

According to the present invention as described in the immediately preceding paragraph, the control unit drives and controls the drive device based on the forward/backward information so that the direction of the detecting range of the peripheral information acquisition device can be switched forward or backward.

In the configuration of the present invention as described above, the peripheral object detection system may further comprise at least one peripheral information acquisition device as defined above to include plural peripheral information acquisition devices, and a peripheral object computing system for detecting a direction of a body of the vehicle to the object, which is to be detected and may hereinafter be called "the target object", based on distance information outputted from the plural peripheral information acquisition devices.

According to the present invention as described in the immediately preceding paragraph, the plural peripheral information acquisition devices are arranged at different positions of the vehicle, thereby making it possible to obtain detection results (a parallax) of the same target object as measured from different detecting points. The direction of the vehicle body to the target object can also be determined by using these detection results.

In the configuration of the present invention as described above, the plural peripheral information acquisition devices may be arranged on opposite end portions, in a lateral direction of the body, on a front section of the vehicle, respectively, and may extend outward beyond opposite outermost end faces of the vehicle, the opposite outermost end faces being located outermost in the lateral direction of the body, respectively.

In a vehicle, especially a heavy-duty vehicle like a mine haulage vehicle, its front wheels may consist of two wheels while its rear wheels may consist of four wheels. In this case, the rear wheels may be located outward beyond the vehicle main body in the lateral direction of the vehicle body, and the outer side walls of the rear wheels may become the opposite outermost end faces of the vehicle. If the peripheral information acquisition devices are on a front section of the vehicle main body in an attempt to perform peripheral monitoring of the area backward of the vehicle, the rear wheels may be included in the detecting ranges when the peripheral information acquisition devices are directed backward. In this case, areas further backward of the rear wheels may become blind spots from the peripheral information acquisition devices. According to the present invention as described in the immediately preceding paragraph, the peripheral information acquisition devices are arranged extending outward beyond the opposite outermost end faces, respectively. It is, therefore, possible to make smaller the parts of the vehicle, which are to be included in the detecting ranges, especially when peripheral monitoring of the area backward of the vehicle is performed.

In the configuration of the present invention as described above, the control unit may be configured to receive an input of travelling speed information on the vehicle such that the drive device changes an angle of elevation of the peripheral information acquisition device according to the traveling speed information.

In the present invention as described in the immediately preceding paragraph, the angle of elevation of the peripheral information acquisition device changes according to the traveling speed so that the direction of the detecting range of the peripheral information acquisition device can be changed. When the traveling speed is high, the detecting range can hence be set at a position farther from the vehicle by increasing the angle of elevation.

In the configuration of the present invention as described above, the control unit may be configured to acquire, as the forward/backward information, information on setting of a direction of rotation of an output gear in a transmission provided on the vehicle or information on a direction of rotation of a wheel provided on the vehicle.

In the configuration of the present invention as described in the immediately preceding paragraph, the direction of the detecting range of the peripheral information acquisition device can be switched forward or backward and the angle of elevation of the peripheral information acquisition device can be changed, both based on the direction of rotation of the output gear or wheel. Especially when the information on the setting of the direction of rotation of the output gear in the transmission is used, the switching of the direction of the detecting range can be performed before the output gear actually rotates, that is, before the vehicle travels. It is, therefore, possible to perform the detection of the target object before the vehicle actually begins to move.

In another aspect of the present invention, there is also provided a haulage vehicle comprising a haulage vehicle main body, a peripheral information acquisition device mounted on the haulage vehicle main body and configured to have, as a detected range, a part of a peripheral space of the vehicle and to acquire distance information to an object that exists in the detected range and is to be detected, and a detecting range switching mechanism configured to switch, toward an area forward or backward of the haulage vehicle, a direction of a detecting range of the peripheral information acquisition device based on forward/backward information that indicates whether the haulage vehicle is moving in a forward direction or in a reverse direction.

According to the present invention as described in the immediately preceding paragraph, the direction of the detecting range of the peripheral information acquisition device is switched according to the forward/backward information on the haulage vehicle. With the single peripheral information acquisition device, it is, therefore, possible to perform forward and backward monitoring of the haulage vehicle, specifically performing the measurement of a distance to target objects that exist in areas forward, and backward of the vehicle, respectively, and are to be detected. Compared with the case in which forward and backward peripheral information acquisition devices are provided, the number of parts and components can be decreased accordingly. As is appreciated from the foregoing, the present invention can realize, in the another aspect thereof, forward and backward monitoring of the haulage vehicle at low costs by monitoring forward when the monitoring of the area forward of the haulage vehicle is needed and by monitoring backward when the monitoring of the area backward of the haulage vehicle is needed.

According to the present invention, it is possible to provide a peripheral object detection system, which can perform at lower costs the detection of objects existing in forward and backward peripheries of a mine haulage vehicle, and a haulage vehicle with the peripheral object detection system mounted thereon. Problems, configurations and advantageous effects other than those described above will become apparent from the following description of embodiments.

BRIEF DESCRIPTION OF THE DRAWINGS

FIGS. 3A and 3B are diagrams illustrating states that another fixing structure for the LIDAR sensor as attached with its axis of rotation tilted as a tilt axis, in which FIG. 3A shows a, forward monitoring state and FIG. 3B depicts a backward monitoring state.

FIGS. 4A and 4B illustrate a further fixing structure that is rotatable about a horizontal axis intersecting an axle at right angles, in which FIG. 4A shows a forward monitoring state and FIG. 4B depicts a backward monitoring state.

FIGS. 6A to 6C are diagrams illustrating about the rotation angle of the axis of rotation (vertical axis) of the fixing structure upon switching the direction of the detecting range of the LIDAR sensor, in which FIG. 6A shows how the rotation angle is switched in two stages, FIG. 6B depicts how the rotation angle is switched linearly according to the traveling speed, and FIG. 6C illustrates how the rotation angle is switched stepwise according to the traveling speed.

FIGS. 12A and 12B are diagrams illustrating processing in the forward monitoring state, in which FIG. 12A shows a row of measuring points as illustrative measurement positions and FIG. 12B illustrates detection processing of a shoulder.

FIGS. 13A and 13B are diagrams illustrating processing in the backward monitoring, in which FIG. 13A shows the illustrative positions of measuring points and FIG. 13B illustrates detection processing of a stop mound.

FIG. 16 is a flow chart illustrating processing for autonomous traveling of the unmanned dump truck.

FIGS. 17A and 17B are diagrams illustrating differences in effects depending on the fixing position of a laser irradiation and reception module on the unmanned dump truck, in which FIG. 17A shows a situation where the laser irradiation and reception module is fixed at a position lower than the height position of the of front wheels and FIG. 17B depicts another situation where the laser irradiation and reception module is fixed at a position higher than the height position of the front wheels.

FIGS. 18A and 18B are explanatory diagrams illustrating a comparative example with a laser irradiation and reception module arranged on a rear part of an unmanned dump truck, in which FIG. 18A is a side view showing a state that the laser irradiation and reception module is arranged on the rear part of the unmanned dump truck and FIG. 18B depicts a state that dust has risen.

DETAILED DESCRIPTION OF PREFERRED EMBODIMENTS

With reference to the accompanying drawings, a description will hereinafter be made about embodiments of the present invention. In the following embodiments, they will be described by dividing them into plural sections or combining them as plural embodiments whenever needed for the sake of convenience. When the numbers of elements and the like (including the numbers of parts or components, numerical values, amounts, ranges, and so on) are referred to in the following embodiments, they shall not be limited to any specific numbers and may be not smaller or not greater than specific numbers unless specifically indicated or unless apparently limited to specific numbers in principle. In the following embodiments, their constituent elements (including processing steps and the like) are not absolutely essential unless specifically indicated or unless clearly considered to be essential in principle.

Further, the individual configurations, functions, processing units, processing means and the like in the following embodiments may be partly or wholly realized as integrated circuits or other hardware. Alternatively, the below-described individual configurations, functions, processing units, processing means and the like may be realized as programs to be executed on a computer, in other words, may be realized as software. Information on programs, tables, files and the like, which realize the individual configurations, functions, processing units, processing means and the like, can be stored in storage devices such as memories, hard disks or SSDs (solid state drives) or the like or storage media such as IC cards, SD cards or DVDs. Further, the individual constituent elements may be made up of ASICs (Applicant Specific Integrated Circuits) rather than being formed in cooperation of hardware and software.

Throughout the drawings that illustrate the embodiments, members having the same functions are identified by the same or related designations, and their repeated descriptions will be omitted. It is also to be noted that in the following embodiments, the description of the same or similar parts will not be repeated as a general rule unless specifically needed.

<First Embodiment>

Figure 1:
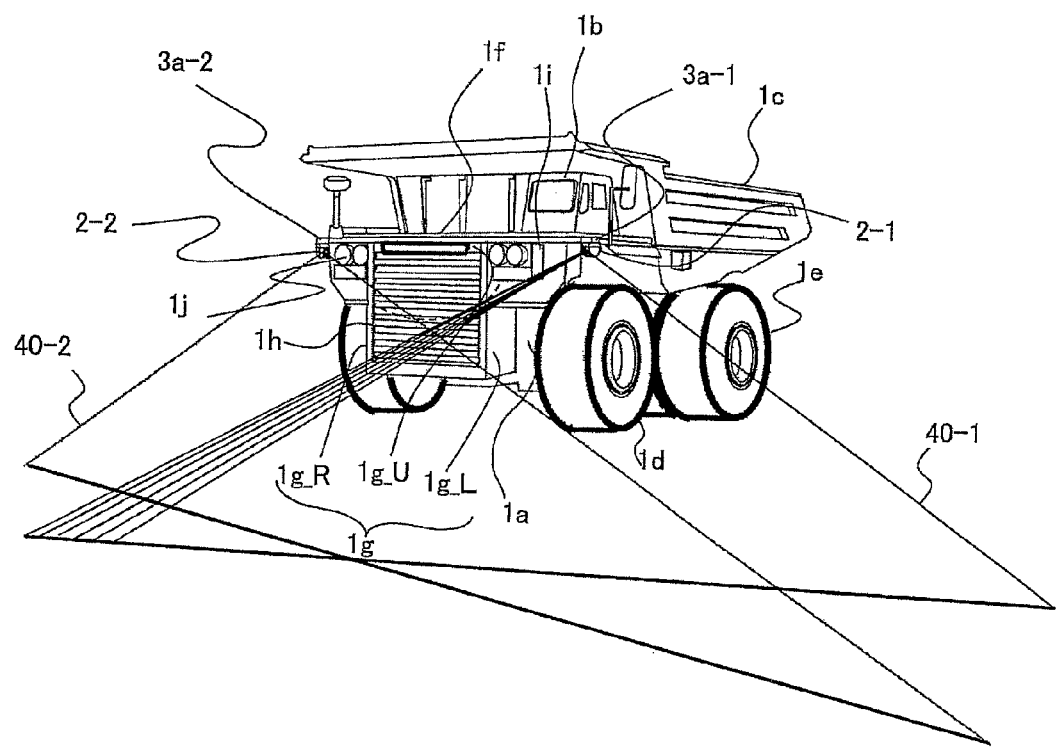
FIG. 1 is a schematic configuration diagram of an unmanned dump truck with a peripheral object detection system according to a first embodiment of the present invention being mounted thereon.
Figure 2:
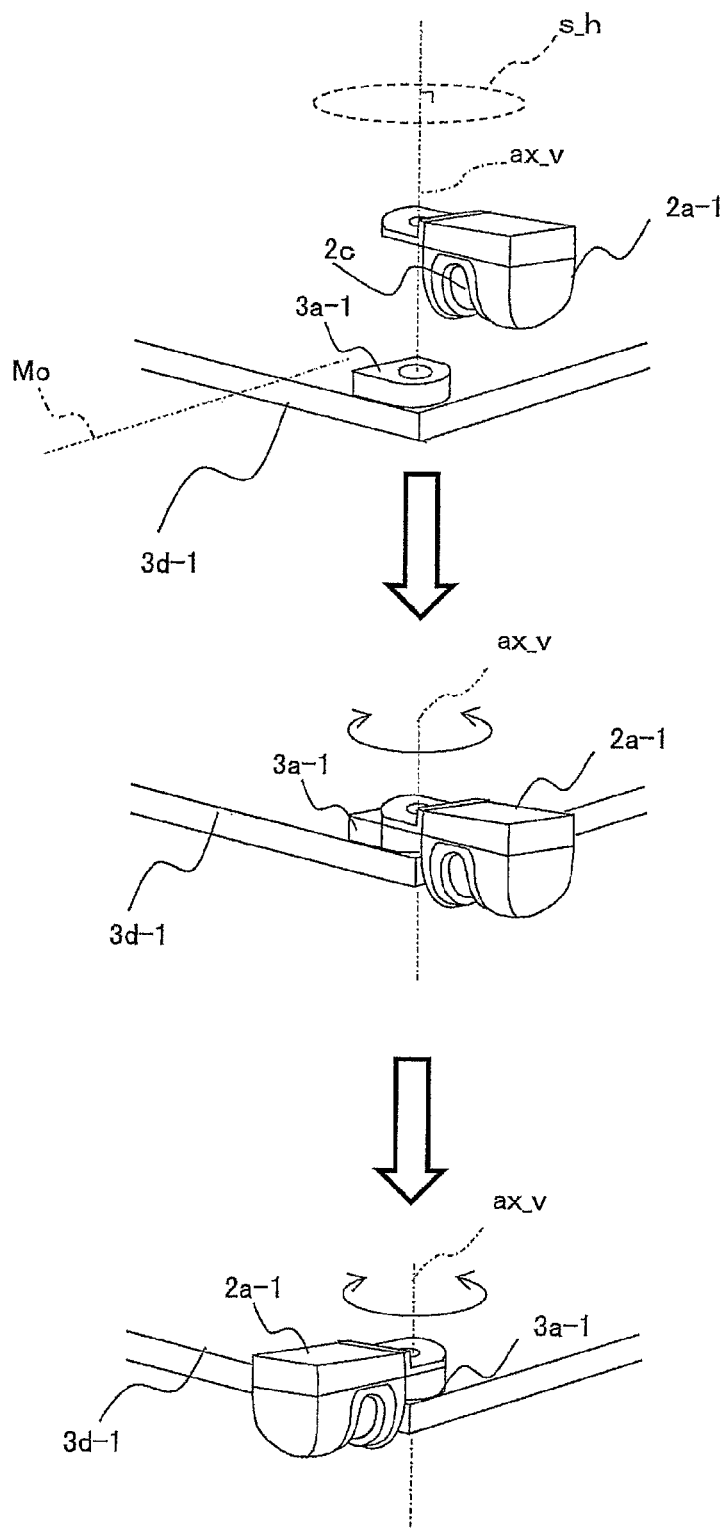
FIG. 2 is a schematic perspective view illustrating a fixing structure for a LIDAR sensor and a manner of its operation for switching forward or backward the direction of a detecting range of the LIDAR sensor.

The first embodiment is an embodiment that switches to a forward monitoring state or a backward monitoring state depending on whether an unmanned dump truck 1 as a haulage vehicle is traveling forward or in preparation for traveling or is traveling in reverse. In addition, the first embodiment also includes an embodiment that during forward traveling, the position of a detecting range is displaced further forward. Referring first to FIGS. 1 and 2, a description will be made about an unmanned dump truck with a peripheral object detection system according to the first embodiment as mounted thereon and fixing structures for LIDAR sensors in the peripheral object detection system.

FIG. 1 is a schematic configuration diagram of the unmanned dump truck with the peripheral object detection system according to the first embodiment being mounted thereon. FIG. 2 is a schematic perspective view illustrating the fixing structure for the LIDAR sensor and the manner of its operation for switching forward or backward the direction of the detecting range of the LIDAR sensor.

As illustrated in FIG. 1, the unmanned dump truck 1 is provided with a vehicle main body 1a, a cab 1b disposed above a front section of the vehicle main body 1a, a vessel 1c raisably and lowerably mounted as a hauling section on the vehicle main body 1a, and left and right, front wheels 1d and rear wheels 1e that support the vehicle main body 1a for traveling. The front wheels 1d are driven wheels, while the rear wheels 1e are driving wheels. The front wheels 1d consist of two wheels, while the rear wheels 1e consist of four wheels. Each outer rear wheel 1e is located outward beyond its corresponding side wall of the vehicle main body 1a in the lateral direction of the vehicle body. Therefore, opposite outermost end faces, which are located outermost in the lateral direction of the unmanned dump truck 1, are outer side walls of the outer rear wheels 1e.

The cab 1b is disposed on a substantially flat, upper deck 1f to facilitate an operator to ingress to and egress from the cab 1b. The upper deck 1f is arranged above upper end portions of the front wheels 1d to cover the front wheels 1d. Further, the upper deck 1f is arranged on the front section of the vehicle main body 1a, and is dimensioned sufficient to extend over the entire width of the vehicle main body 1a. In a central part under the upper deck 1f, a grilled compartment 1g is disposed. The grilled compartment 1g is substantially constructed of a left side wall 1g_L, a right side wall 1g_R facing the left side wall 1g_L with an interval therebetween, and a top wall 1g_U placed extending between these left and right side walls 1g_L and 1g_R, and is formed in a rectangular parallelepipedal shape defined by these left and right side walls 1g_L and 1g_R and top wall 1g_U.

The grilled compartment 1g is configured to internally accommodate a heat exchanger 1h such as a radiator.

On an outer side of the grilled compartment 1g, air cleaners 1i are fixed. Each air cleaner 1i is fixed in a corner, which is located under the upper deck 1f and is defined by the upper deck 1f and the grilled compartment 1g. Each air cleaner 1i is provided with a cylindrical filter element 1j to capture dust in air. Each filter element 1j is attached to the corresponding, air cleaner 1i in a state that at an end thereof, it extends forward beyond a front end portion of the upper deck 1f.

On the respective opposite ends of a front part of the upper deck 1f, specifically on the respective opposite ends of the upper deck 1f as viewed in the lateral direction of the unmanned dump truck 1, two peripheral information acquisition devices are provided to detect the relative positions of peripheral objects (target objects) around the unmanned dump truck 1. Each peripheral information acquisition device has, as a detected range, a part of a peripheral space of the unmanned dump truck 1, and acquires distance information to the target object that exists in the detected range. In this embodiment, LIDAR sensors are used as peripheral information acquisition devices, but visible light cameras may be used instead. By changing the directions of image pick-up units, which take images of surrounding environment, when the visible light cameras are used or by changing the directions of laser irradiation and reception modules (see FIG. 7), which irradiate laser beams and receive scattered light, when the LIDAR sensors are used, the directions of their detecting ranges can be changed.

These peripheral information acquisition devices may hereinafter be described by calling them "LIDAR sensors 2-1, 2-2".

The LIDAR sensors 2-1, 2-2 are fixed on the upper deck 1f via platforms 3a-1, 3a-2, which are rotatable about axes of rotation (which may hereinafter be also called "vertical axes") so that the directions of the detecting ranges of the LIDAR sensors 2-1, 2-2 can be set forward or backward. The platforms 3a-1, 3a-2 are constituent elements of a detecting range switching mechanism, which switches the directions of the detecting ranges of the LIDAR sensors 2-1, 2-2 based on forward/backward information that indicates whether the moving direction of the unmanned dump truck 1 is forward or backward. As the forward/backward information, information on the setting of the direction of rotation of an output gear in a transmission (see FIG. 7) or information on the direction of rotation of one of the wheels provided on the unmanned dump truck 1 may be used.

Figure 7:
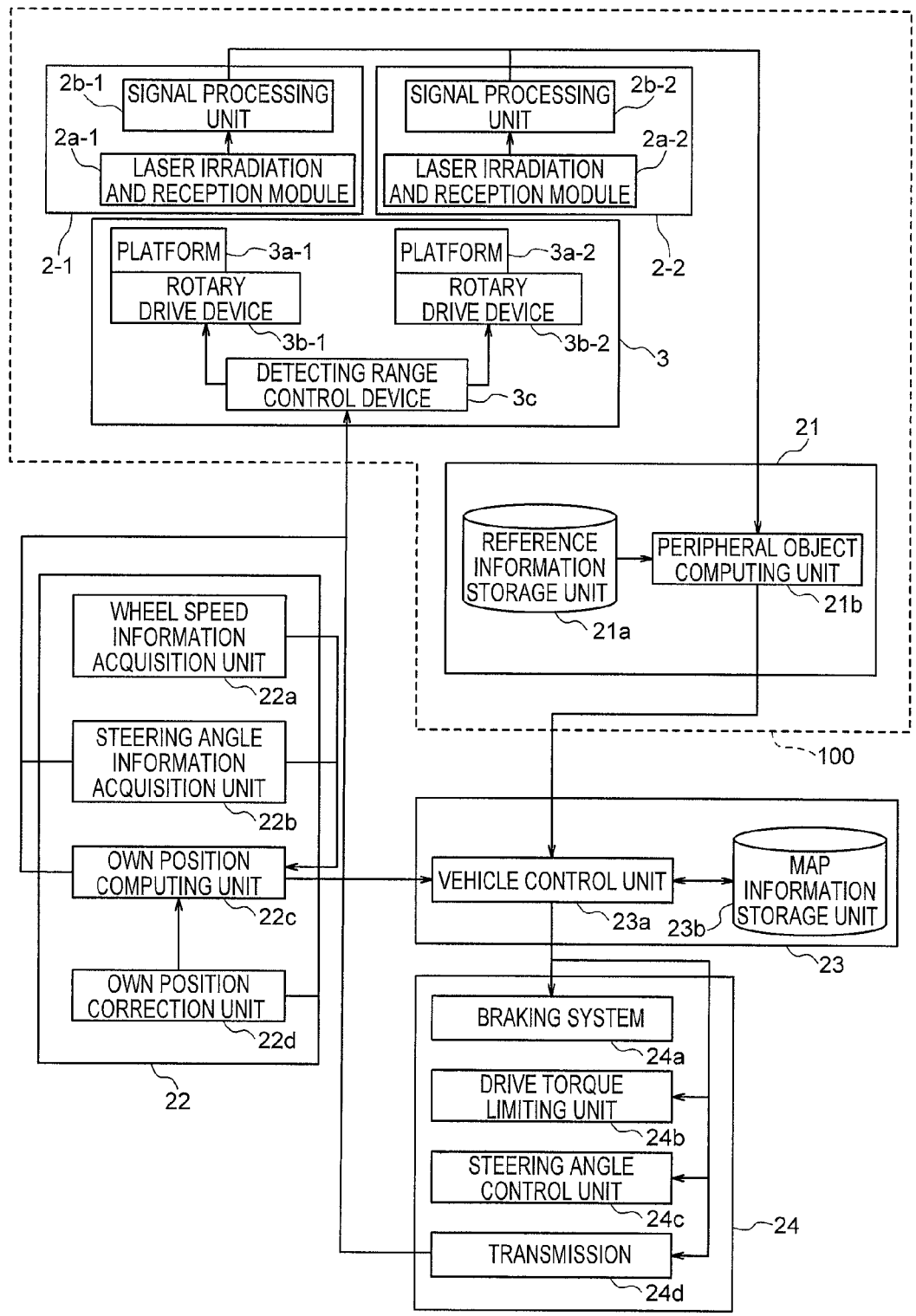
FIG. 7 is a functional block diagram illustrating the functional configuration of the peripheral object detection system according to the first embodiment.

The detecting range switching mechanism further includes two rotary drive devices 3b-1, 3b-2 and a detecting range control unit 3c (see FIG. 7). The rotary drive devices 3b-1, 3b-2 rotate the corresponding platforms 3a-1, 3a-2 independently or in tandem with each other, and the detecting range control unit 3c performs driving and control of the rotary drive devices 3b-1, 3b-2. Using forward/backward information that indicates the traveling direction of the unmanned dump truck 1 or, when the unmanned dump truck 1 is in stop, the direction in which the unmanned dump truck 1 starts traveling, the detection range control unit 3c rotates and drives the rotary drive devices 3b-1, 3b-2. In the following description, the peripheral information acquisition devices 2-1, 2-1 will be called "the peripheral information acquisition devices 2" when they are collectively called, the platforms 3a-1, 3a-2 will be called "the platforms 3a" when they are collectively called, and the rotary drive devices 3b-1, 3b-2 will be called "the rotary drive devices 3b" when they are collectively called.

The peripheral information acquisition devices 2 are fixed at positions that, when the unmanned dump truck 1 detects a shoulder located besides a forward road surface while traveling forward, the individual filter elements 1j and air cleaners 1i and the grilled compartment 1g, which are provided extending out from a front surface of the vehicle main body 1a into scan planes 40-1, 40-2, do not enter the below-described irradiation and reception angle range of laser beams. The peripheral information acquisition devices 2 are arranged at positions higher than the upper end portions of the front wheels 1d, at the left and right of the front section, that is, the side of the traveling direction of the vehicle main body 1a, and at the same height position. Described specifically, the peripheral information acquisition devices 2 are arranged, for example, at equal height positions approximately 4 m from the lower ends of the front wheels 1d.

Referring next to FIG. 2, a description will be made about the fixing structures for the peripheral information acquisition devices. As the fixing structures for the peripheral information acquisition devices 2-1, 2-2 are the same, a description will be made about the peripheral information acquisition device 2-1, and with respect to the peripheral information acquisition device 2-2, its repeated description is omitted.

As illustrated in FIG. 2, a holding member 3d-1 is provided on a left side of the lower side of the upper deck 1f. The holding member 3d-1 is provided extending outward beyond an outermost end face of the vehicle main body 1a (in FIG. 2, the position of the outermost end face is indicated at designation Mo), that is, outward beyond the outer side wall of the corresponding rear wheel 1e in the lateral direction of the vehicle main body. The platform 3a-1 is fixed to a corner part of the holding member 3d-1 on the side of its open end rotatably about a vertical axis ax_v as an axis of rotation. The peripheral information acquisition device 2-1 is fixed on the platform 3a-1, and the peripheral information acquisition device 2-1 also rotates following rotation of the platform 3a-1. When the platform 3a-1 is rotated in a backward direction about the vertical axis ax_v as the axis of rotation, the peripheral information acquisition device 2-1 is displaced into a backward monitoring state (FIG. 2, middle). When the platform 3a-1 is rotated in a forward direction, on the other hand, the peripheral information acquisition device 2-1 is displaced into a forward monitoring state (FIG. 2, bottom).

The peripheral information acquisition device 2-1 irradiates laser beams at predetermined angles to scan the road surface in the shape of a circular sector, and receives scattered light produced by reflection from a peripheral object (a shoulder in forward monitoring; in backward monitoring, a detected shoulder is recognized as a stop mound).

Actually, the peripheral information acquisition device 2-1 scans over 360° by gradually changing the optical axis of a laser beam 41 (see FIGS. 3A and 3B), specifically the direction of its irradiation at predetermined angles, for example, angles of 0.25 degrees. While performing irradiation at the predetermined angles, the peripheral information acquisition device 2-1 receives scattered light. Owing to the provision of a member, which shields such laser beams 41, and an opening formed in a part of this member, the peripheral information acquisition device 2-1 is limited in the irradiation range of laser beams and the light receiving range (detecting range) of scattered light. The opening in the shield member will hereinafter be called "the detection aperture 2c". The size of the opening of the detection aperture 2c defines the irradiation range of the laser beams 41, consequently the detecting range.

Figure 3A:
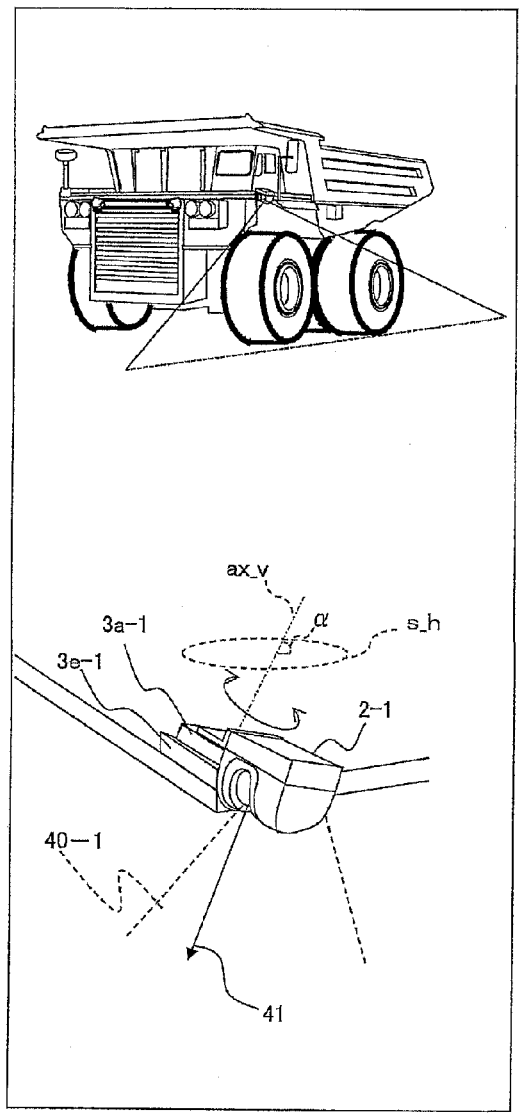
Figure 3B:
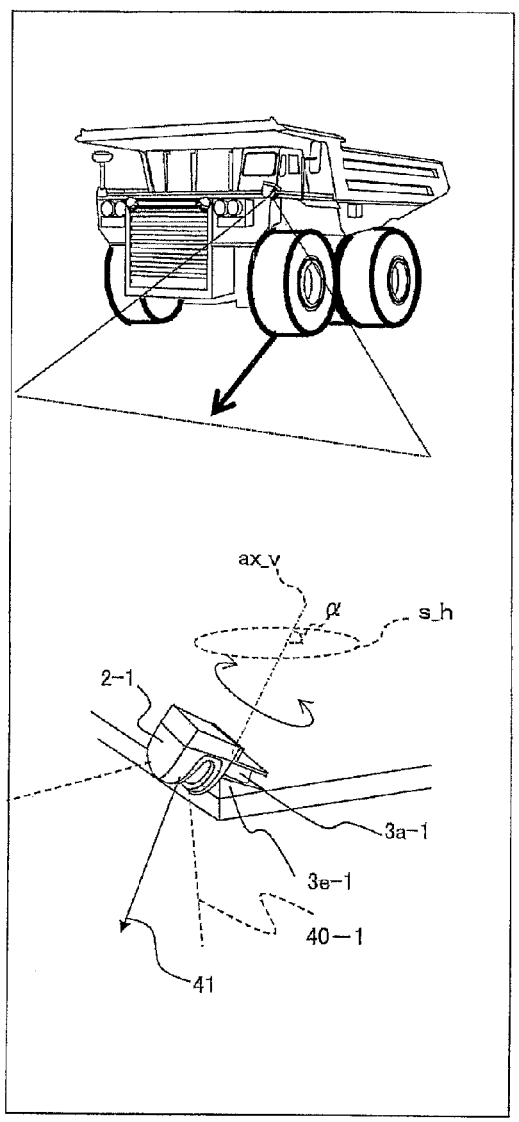
Figure 4A:
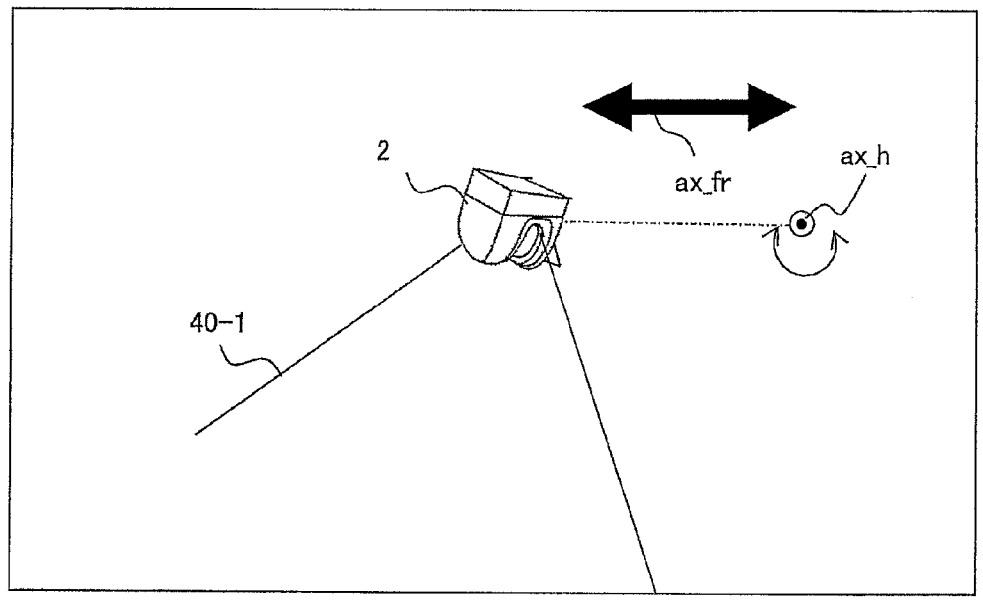
Figure 4B:
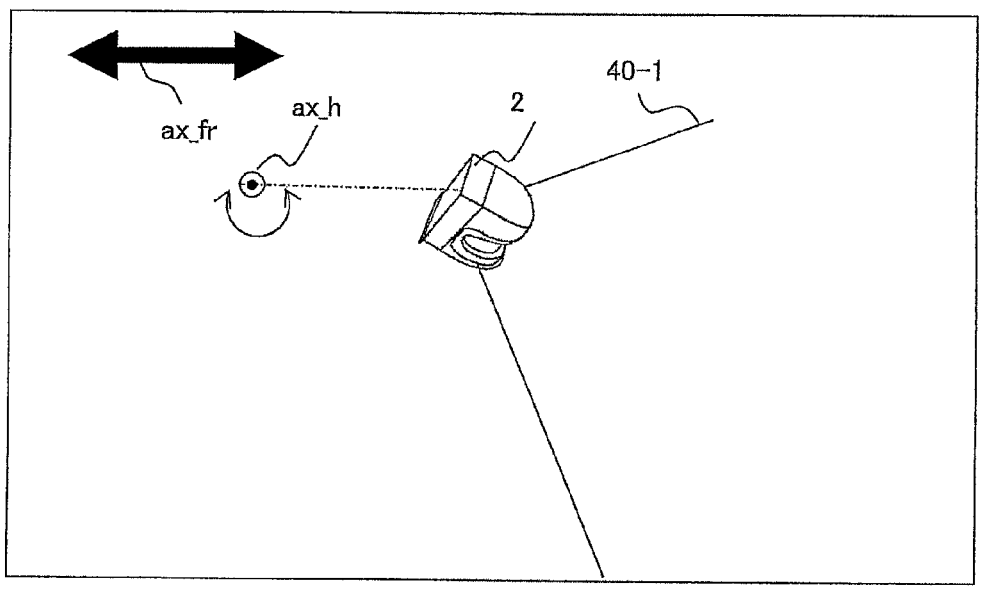

Other examples of the fixing structures for the peripheral information acquisition devices 2 will be described with reference to FIGS. 3A and 3B and FIGS. 4A and 4B. FIGS. 3A and 3B are diagrams illustrating states that another fixing structure for the peripheral information acquisition device 2 is attached with its axis of rotation tilted as a tilt axis, in which FIG. 3A shows a forward monitoring state and FIG. 3B depicts a backward monitoring state. FIGS. 4A and 4B illustrate a further fixing structure that is rotatable about a horizontal axis intersecting an axle at right angles, in which FIG. 4A shows a forward monitoring state and FIG. 4B depicts a backward monitoring state.

As illustrated in FIGS. 3A and 3B, the fixing structure may be provided with an axis-tilting platform 3e-1 that tilts the vertical axis ax_v (in other words, the axis of rotation) of FIG. 2 at an inclination α with respect to a horizontal plane s_h. By changing the angle of rotation of the vertical axis ax_v according to the travelling speed, the direction of the detecting range can be switched from "backward" (FIG. 3A) to "forward" (FIG. 3B). The fixing structure is also provided with a mechanism (not illustrated) that can change the height or inclination α of the axis-tilting platform 3e-1, whereby in the forward monitoring state, the scan plane can be placed at a position apart forward from the unmanned dump truck 1 according to the traveling speed. For example, the rotational speed of one of the wheels (see FIG. 7) provided on the unmanned dump truck 1 may be acquired as travelling speed information, and may then be used as the traveling speed.

As illustrated in FIGS. 4A and 4B, the peripheral information acquisition device 2 may be displaced from the forward monitoring state of FIG. 4A into the backward monitoring state of FIG. 4B by rotating it about a horizontal axis ax_h, which intersects an axle direction ax_fr at right angles in a horizontal plane, as an axis of rotation, in other words, by rotating it in the direction of elevation. In the forward monitoring state of FIG. 4A, the positions of measuring points can be adjusted farther or closer relative to the unmanned dump truck 1 as a reference by simply adjusting the angle of elevation according to the traveling speed.

Figure 5:
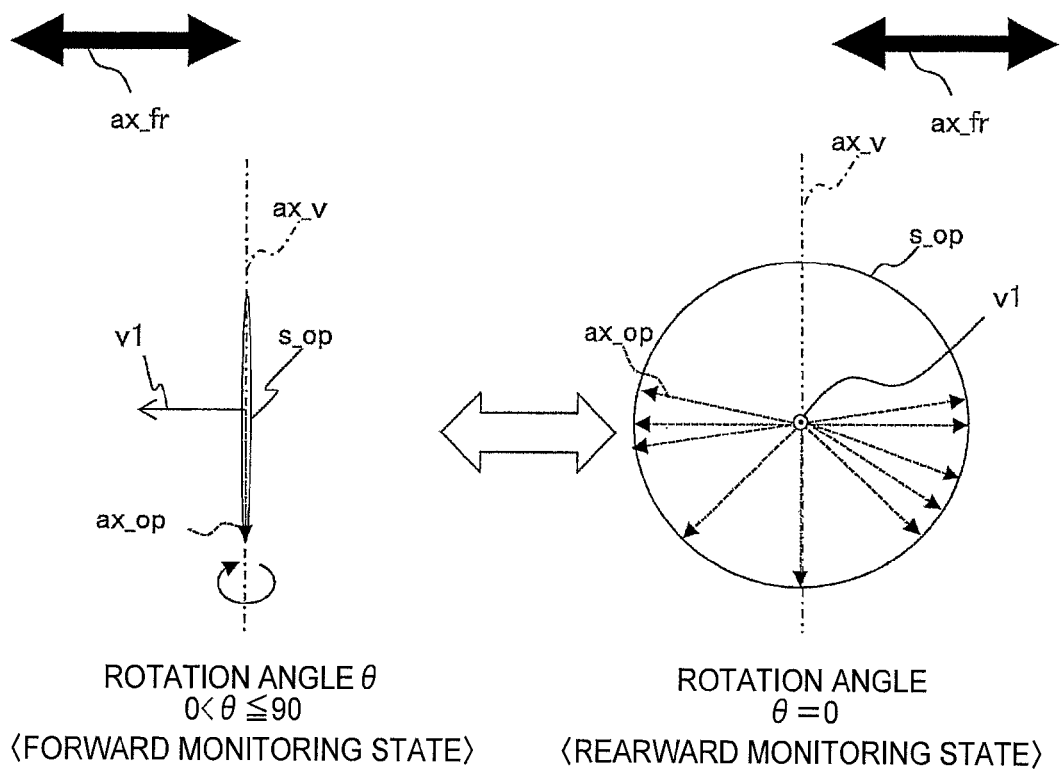
FIG. 5 is a diagram illustrating the position of the LIDAR sensor during forward monitoring and the direction of the detecting range of the LIDAR sensor during backward monitoring.

With reference to FIG. 5, a detailed description will be made about the position of each peripheral information acquisition device during forward monitoring and the direction of its detecting range during backward monitoring. FIG. 5 is a diagram illustrating the position of the peripheral information acquisition device during the forward monitoring and the direction of its detecting range during the backward monitoring. Using the diagram of FIG. 5 illustrating the state at the time of the backward monitoring, a description will be made about a scan plane. The scan plane s_op is formed by scanning the optical axis ax_op of the laser beam 41 over 360°. An axis of rotation for the optical axis ax_op is called a "scan axis". Designations 40-1,40-2 in FIG. 1 indicate partial regions of the scan planes s_op of the two peripheral information acquisition devices 2-1,2-2. Designation v1 in FIG. 5 indicates a normal vector of the scan plane s_op. The normal vector is parallel to the scan axis. In the state at the time of the forward monitoring, the platform 3a is rotated about the vertical axis ax_v as an axis of rotation such that the normal vector v1 extends substantially parallel to the axle direction ax_fr and is directed forward of the unmanned dump truck 1. In the state at the time of the backward monitoring, on the other hand, the platform 3a is rotated about the vertical axis ax_v as an axis of rotation such that the normal vector v1 is directed substantially perpendicular to the axle direction ax_fr. In the foregoing description, the angle of rotation is represented by assuming, as a basis, that a rotation angle θ is zero (θ=0) in the state at the time of the backward monitoring, described specifically, in a state that the scan plane s_op is parallel to the corresponding side wall of the vehicle main body 1a, and a rotation angle θ at the time of the forward monitoring is indicated by a positive value.

Figure 6A:
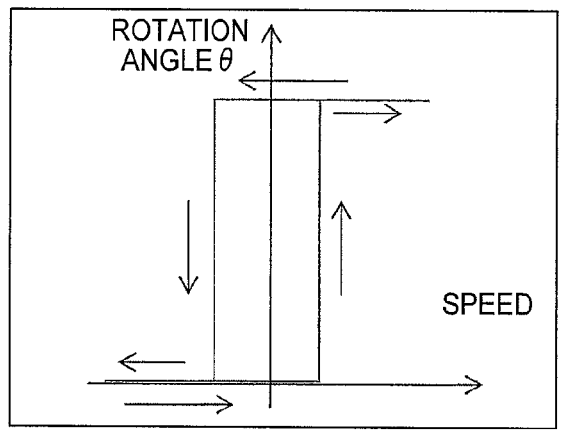
Figure 6B:
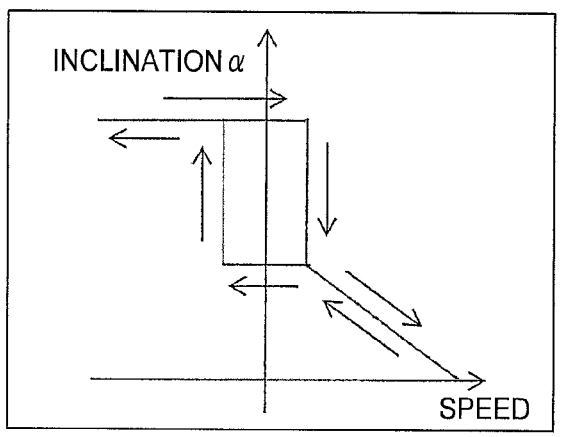
Figure 6C:
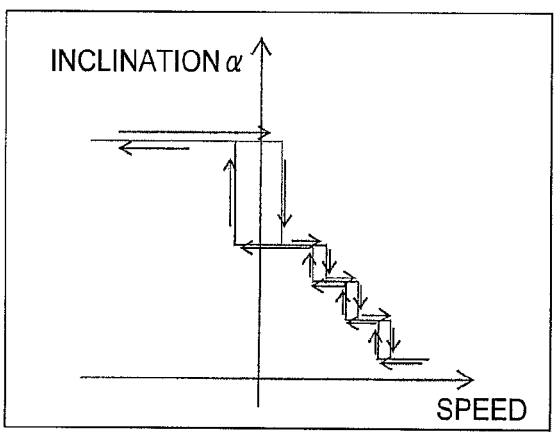

Referring next to FIGS. 6A to 6C, a description will be made about the rotation angle of the axis of rotation (vertical axis) upon switching the direction of the detecting range, in which FIG. 6A shows how the rotation angle is switched in two stages, FIG. 6B depicts how the rotation angle is switched linearly according to the traveling speed, and FIG. 6C illustrates how the rotation angle is switched stepwise according to the traveling speed.

When selectively displacing the scan plane s_op to one of two positions, specifically the position at the time of forward monitoring or the position at the time of backward monitoring, its switching at a traveling speed of 0 leads to a phenomenon that the directions of the platforms are frequently changed during a stop. Hysteresis characteristics (dead zone) are, therefore, included in switching conditions for the rotation angle. Switching conditions for the rotation angle θ, which include hysteresis characteristics, are shown in FIG. 6A. The traveling speed and the rotation angle θ change along the direction of arrows. For example, a little while after a transition from a backward traveling state (traveling speed: negative value) to a forward traveling state (traveling speed: positive value) via a stop (traveling speed: 0), the rotation angle θ changes from a negative value to a positive value. Similarly, a little while after a transition from a forward traveling state (traveling speed: positive value) to a backward traveling state (traveling speed: negative value) via a stop (traveling speed: 0), the rotation angle θ changes from a positive value to a negative value. As will be described subsequently herein, either a forward monitoring state or a backward monitoring state may be selected during a stop based on output information from a transmission provided on the unmanned dump truck 1.

Taking the inclination α of FIGS. 3A and 3B as an example, a description will be made about a case in which the direction of the detecting range is switched according to the traveling speed. Also in this case, hysteresis characteristics are included in the switching conditions for the rotation angle. Taking a horizontal plane as a reference, the inclination α is defined to have a positive value in a clockwise direction. In this case, the inclination α is assumed to have a value greater than 90° but smaller than 180° when the traveling speed is lower than 0 (in a state of traveling in reverse), while the inclination α is assumed to have a value greater than 0° but smaller than 90° when the traveling speed is not smaller than 0 (when the unmanned dump truck is in a stop state or is in a state of preparation for forward traveling or in a state of forward traveling). Of these switching manners, a case that during forward traveling, the inclination α is adjusted linearly (in a stepless manner), for example, based on wheel speed information is depicted in FIG. 6B, and a case that during forward traveling, the inclination α is adjusted stepwise, for example, based on the information on the setting of the gear ratio of the transmission is illustrated in FIG. 6C.

As a still further example of switching the direction of the detecting range to "forward" or "backward", a mirror may be arranged instead of directly disposing the main body of the peripheral information acquisition device 2 on the platform 3.

Referring next to FIG. 7, a description will be made about the functional configuration of the peripheral object detection system according to this first embodiment. FIG. 7 is a functional block diagram illustrating the functional configuration of the peripheral object detection system according to the first embodiment.

As illustrated in FIG. 7, the peripheral object detection system 100 according to this embodiment includes two LIDAR sensors 2-1,2-2, a detecting range switching mechanism 3, and a peripheral object computing system 21. The LIDAR sensors 2-1,2-2 serve as peripheral information acquisition devices for determining the direction of the vehicle main body 1a to a peripheral object and measuring the distance to the peripheral object. The detecting range switching mechanism 3 switches the direction of the detecting range of each of the LIDAR sensors 2-1,2-2. The peripheral object computing system 21 determines the profile of the peripheral object and the direction of the vehicle body to the peripheral object, both based on the distance measurement results from the LIDAR sensors 2-1,2-2.

The vehicle main body 1a is provided with an own position measuring unit 22, a body motion control unit 23, and a body drive unit 24. The own position measuring unit 22 measures the position and posture of the vehicle main body 1a. The body motion control unit 23 changes the distance of the vehicle main body 1a from the peripheral object and the traveling speed of the vehicle main body 1a. The body drive unit 24 drives the vehicle main body 1a under control by the body motion control unit 23.

The LIDAR sensor 2-1 includes a laser irradiation and reception module 2a-1 and a signal processing unit 2b-1. The laser irradiation and reception module 2a-1 irradiates the laser beams already described above, and receives scattered light produced by reflection from the peripheral object (detected object). The signal processing unit 2b-1 determines the distance between the LIDAR sensor 2-1 and the peripheral object and the approaching direction of the LIDAR sensor 2-1 toward the peripheral object (whether the LIDAR sensor 2-1 is moving toward or away from the peripheral object). The LIDAR sensor 2-2 has a similar configuration as the LIDAR sensor 2-1, and therefore its description is omitted. When the laser irradiation and reception modules 2a-1,2a-2 and the signal processing units 2b-1,2b-2 are collectively referred to, respectively, they will be described as laser irradiation and reception modules 2a and signal processing units 2b.

The signal processing unit 2b-1 receives scattered light produced at respective irradiation angles of the laser irradiation and reception module 2a-1, and performs distance-measuring processing. The signal processing unit 2b-1 has an angular resolution capability of, for example, 0.25 degrees, and its resolution capability between measuring points at a point 30 m apart from the LIDAR sensor 2-1 is 0.13 m. Points at which laser beams are reflected on a road surface serve as measuring points upon detection of the road surface.

As mentioned above, the two platforms 3a-1, 3a-2 and the respective laser irradiation and reception modules 2a-1,2a-2 are mechanically connected together, respectively, and rotate as unitary combinations.

The peripheral object computing system 21 includes a reference information storage unit 21a and a peripheral object computing unit 21b. The reference information storage unit 21a stores the positional information on the peripheral object in an external coordinate system (three-dimensional coordinates) around a road surface and the profile information on the peripheral object (when the peripheral object is a road shoulder, for example, its linear or curved profile information), both as acquired by performing measurements beforehand. The peripheral object computing unit 21b compares the positional information produced by the signal processing units 2b-1,2b-2 with the positional information and profile information on the peripheral object and unmanned dump truck 1 as included in the reference information, and determines the direction of the vehicle main body 1a to the peripheral object and the distance from the vehicle main body 1a to the peripheral object.

The own position measuring unit 22 is provided with a wheel speed information acquisition unit 22a, a steering angle information acquisition unit 22b, and an own position computing unit 22c. The wheel speed information acquisition unit 22a measures the rotational speed of one of the wheels, for example, one of the front wheels 1d of the vehicle main body 1a. The steering angle information acquisition unit 22b measures the steering angle of a steering wheel (not shown) arranged in the cab 1b on the vehicle main body 1a. The own position computing unit 22c calculates the traveling speed of the vehicle main body 1a, the angular velocity of one of the front wheel 1d, and the position and posture of the vehicle main body 1a in a coordinate system fixed on the ground, all based on the results of the rotational speed as measured at the wheel speed information acquisition unit 22a and the results of the steering angle as measured at the steering angle information acquisition unit 22b.

The wheel speed information acquisition unit 22a can be a speed sensor or the like for detecting the rotational speed of, for example, one of the front wheels 1d.

The steering angle information acquisition unit 22b can be a displacement sensor or the like, which can detect the steering angle of the steering wheel.

The own position measuring unit 22 is further provided with an own position correction unit 22d for correcting the own position of the vehicle main body 1a. The own position correction unit 22d is included to measure the position and posture of the vehicle main body 1a at still higher accuracy, and is configured, for example, of IMU (Inertial Measurement Unit), GPS (Global Positioning System) or the like.

The wheel speed information acquisition unit 22a, steering angle information acquisition unit 22b and own position correction unit 22d are all connected to the own position computing unit 22c. The information, which has been outputted from the wheel speed information acquisition unit 22a and indicates the direction of rotation of the one wheel, is inputted to the detecting range control device 3c. In addition, the information, which indicates the rotational speed of the one wheel, may also be inputted to the detecting range control device 3c. In this case, the information indicative of the rotational speed is used as traveling speed information. In addition, the information which the steering angle information acquisition unit 22b has acquired may also be inputted to the detecting range control device 3c. In this case, the detecting range control device 3c may use the steering angle information to rotate the laser irradiation and reception module 2a, thereby displacing the detecting range in the lateral direction.

The body motion control unit 23 performs driving and control of the body drive unit 24, and includes a vehicle control unit 23a and a map information storage unit 23b in which map information such as the route of a travel path, the width of its surface A (see FIG. 9), and route attributes (travel path, dumping site, etc.) are stored.

Also included as the map information are, in addition to the coordinates of individual nodes on the travel path and the links connecting the adjacent nodes, shoulder information such as the shape of a shoulder arranged alongside the travel path.

The body drive unit 24 is provided with a braking system 24a, a drive torque limiting unit 24b, a steering angle control unit 24c, and a transmission 24d. The braking system 24a lowers the traveling speed of the vehicle main body 1a or stops the vehicle main body 1a. The drive torque limiting unit 24b limits a rotational torque command value for the rear wheels 1e of the unmanned dump truck 1. The steering angle limiting unit 24c changes the distance of the vehicle main body 1a from a shoulder B (see FIG. 9). The transmission 24d performs changes to the rotational speed and direction (forward or reverse) of the wheels and torque conversions.

Inputted to the vehicle control unit 23a are the map information stored in the map information storage unit 23b, own position information computed at the own position computing unit 22c, and shoulder information measured at the peripheral object computing unit 21b. The vehicle control unit 23a is connected to all of the braking system 24a, the drive torque limiting unit 24b, the steering angle control unit 24c, and the transmission 24d. To limit the distance of the vehicle main body 1a to the shoulder B and the traveling speed of the vehicle main body 1a based on the map information stored in the map information storage unit 23b, the vehicle control unit 23a calculates the amount of braking by the braking system 24a, the amount of a limit by the drive torque limiting unit 24b and the amount of control by the steering angle control unit 24c, and outputs the thus-calculated values to the braking system 24a, drive torque limiting unit 24b and steering angle control unit 24c, respectively. The braking system 24a, drive torque limiting unit 24b and steering angle control unit 24c operate based on the calculated values so inputted.

To the transmission 24d, the vehicle control unit 23a sets a gear position corresponding to the moving direction (forward/reverse) and speed of the unmanned dump truck 1. The transmission 24d operates based on the gear position setting information inputted from the vehicle control unit 23a. This gear position setting information is inputted to the detecting range control device 3c.

The braking system 24a is, for example, a mechanical braking system of mechanical construction such as a disk brake system for braking rotation of the rear wheels 1e.

The drive torque limiting unit 24b is, for example, a retarder bake system, such as an electric brake system that applies an electrical resistance to rotation of the individual rear wheels 1e.

The steering angle control unit 24c changes the steering angle such that the direction of the vehicle body extends along the travel path.

The transmission 24d is configured including speed-changing gears (including plural forward gears and a reverse gear) and a propeller shaft, selects either "forward" or "reverse" by a combination of gears, performs the conversion of a rotational speed and a torque, and transmits rotation power from a power source to another device.

Figure 8:
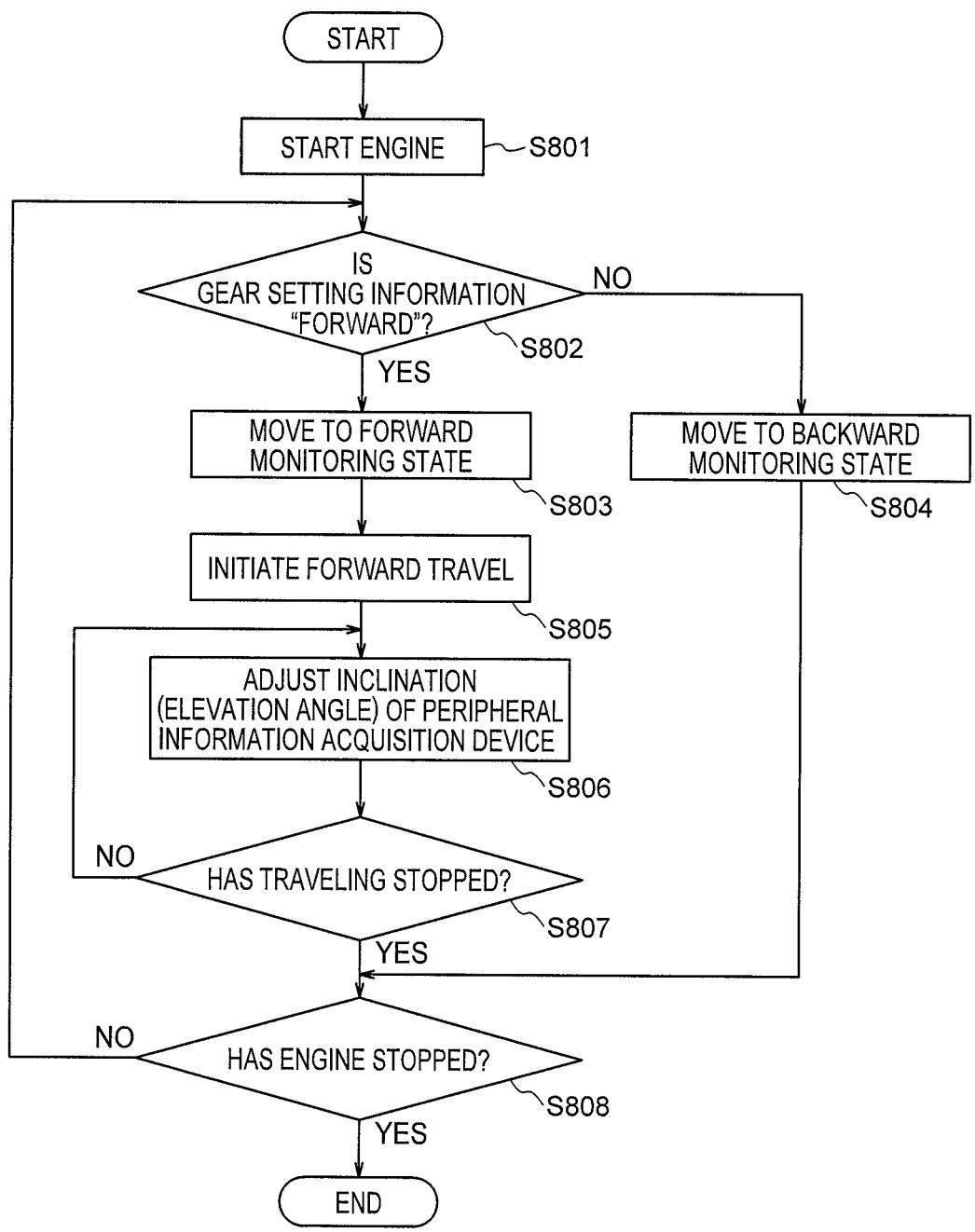
FIG. 8 is a flow chart illustrating a flow of operation of the unmanned dump truck with the peripheral object detection system according to the first embodiment being mounted thereon.

With reference to FIG. 8, a description will be made about a flow of operation of the unmanned dump truck with the peripheral object detection system according to this embodiment. FIG. 8 is a flow chart illustrating the flow of operation of the unmanned dump truck with the peripheral object detection system according to this embodiment being mounted thereon.

When an engine of the unmanned dump truck 1 is started (S801), the detecting range control device 3c acquires gear setting information from the transmission 24d. If the gear setting information indicates "forward" (S802/Yes), the detecting range control device 3c drives the rotary drive devices 3b to rotate the platforms 3a such that the detecting ranges of the laser irradiation and reception modules 2a are directed forward. As a consequence, the peripheral object detection system 100 is brought into a forward monitoring state (S803).

If the gear setting information indicates "reverse" (S802/No.), the detecting range control device 3c drives the rotary drive devices 3b to rotate the platforms 3a such that the detecting ranges of the laser irradiation and reception modules 2a are directed backward. As a consequence, the peripheral object detection system 100 is brought into a backward monitoring state (S804). Details of processing in the forward monitoring state and backward monitoring state will be described subsequently herein.

When the unmanned dump truck 1 starts traveling forward (S805), the detecting range control device 3c acquires a rotational speed of one of the wheels (wheel speed information) from the wheel speed information acquisition unit 22a. Using this wheel speed information as traveling speed information on the unmanned dump truck 1, the detecting range control device 3c drives the rotary drive devices 3b to adjust, according to the traveling speed, the inclinations (elevation angles) a of the laser irradiation and reception modules $2a$ with respect to a horizontal plane (S806). As long as the unmanned dump truck 1 is traveling forward (S807/No), the flow returns to S806 to repeat the processing.

If the unmanned dump truck 1 has stopped traveling (S807/Yes) but the engine has not stopped (S808/No), the flow returns to S802, and gear setting information is acquired again to repeat the processing.

If the engine has stopped (S808/Yes), the processing is ended.

Figure 9:
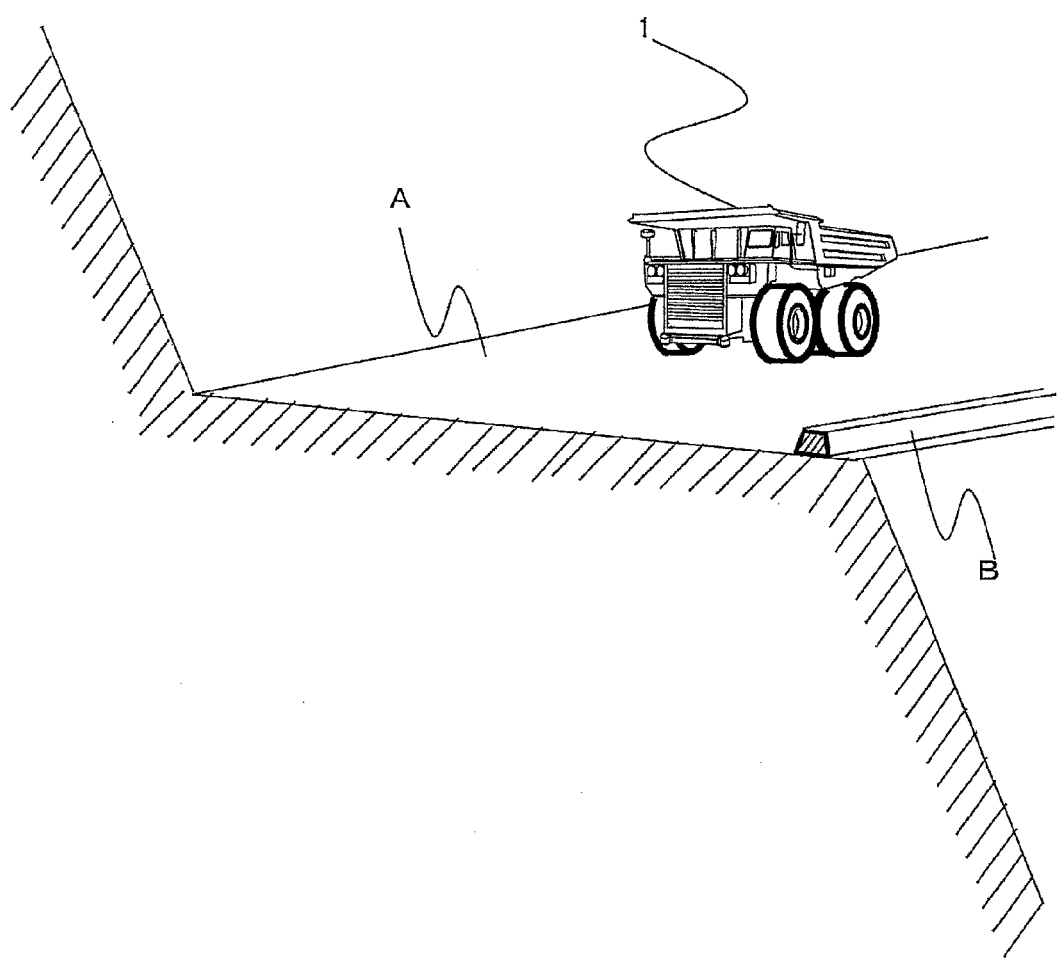
FIG. 9 is a diagram illustrating a state of forward traveling of the unmanned dump truck.
Figure 10:
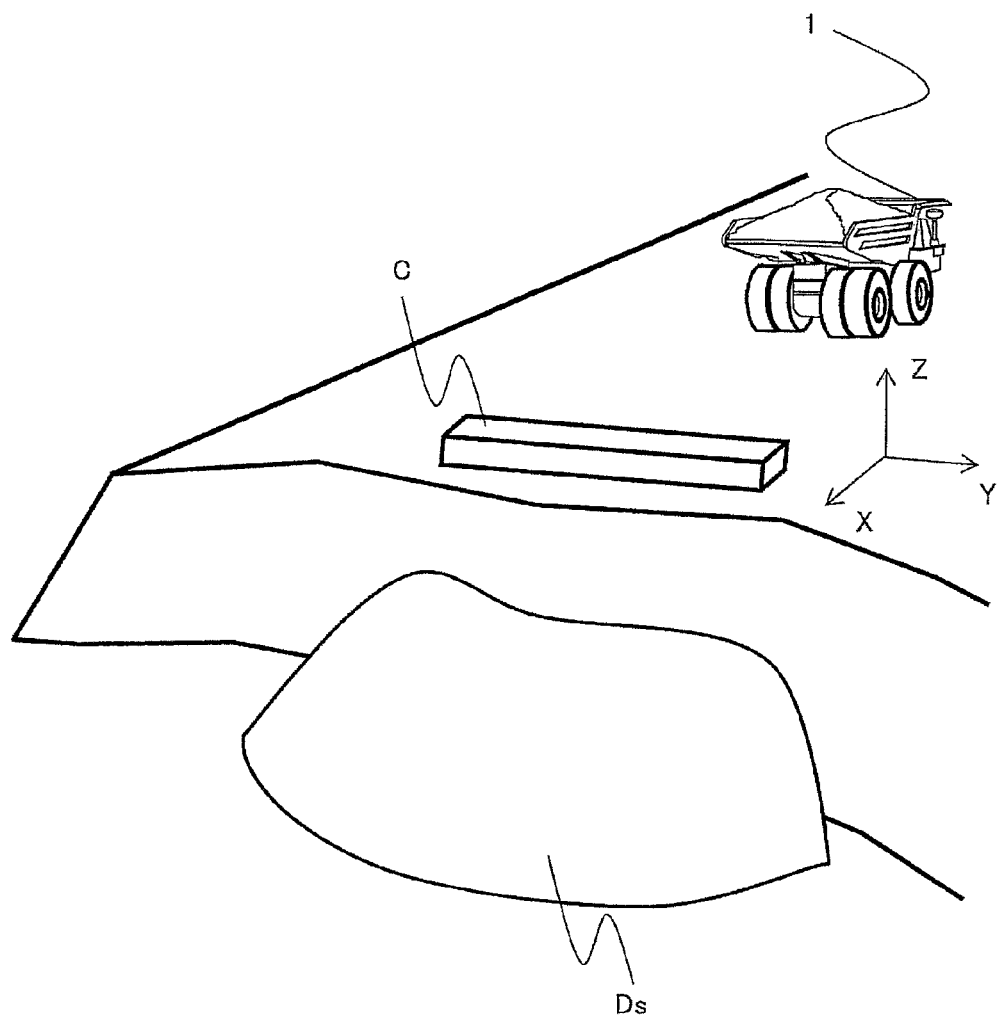
FIG. 10 is a diagram illustrating a state of reverse traveling of the unmanned dump truck in the backward monitoring state.

Referring next to FIG. 9 and FIG. 10, a description will be made about the processing in the forward monitoring state and backward monitoring state. FIG. 9 is a diagram illustrating a state of forward traveling of the unmanned dump truck 1. FIG. 10 is a diagram illustrating a state of reverse traveling of the unmanned dump truck 1 in the backward monitoring state.

As illustrated in FIG. 9, the unmanned dump truck 1 autonomously travels forward on the road surface A of the travel path or the like built beforehand in the mine. During this forward traveling, the peripheral object detection system 100 remains in a forward monitoring state. Alongside the road surface A in the mine, the shoulder B is provided as a target object alongside the road surface A. The shoulder B is provided at least on and along a side where the unmanned dump truck 1 travels, for example, on and along the left side as viewed in the traveling direction, and is an earth mound of a structure having predetermined height and width dimensions.

When the unmanned dump truck 1 with mined waste rock loaded thereon travels on the travel path and reaches near a dumping site Ds arranged below a cliff, the unmanned dump truck 1 travels backward (in reverse) toward the dumping site Ds, stops at the position of a stop mound C, and dumps the mined waste rock, as illustrated in FIG. 10. During this traveling in reverse, the peripheral object detection system 100 remains in a backward monitoring state. It is to be noted that in FIG. 10, the unmanned dump truck 1 travels backward in the direction of the X-axis of the orthogonal coordinate system. The stop mound C is formed of raised earth. When the stop mound and shoulder have the same shape, the peripheral object computing system 21 recognizes, as the shoulder, the shoulder-shaped object detected in the forward monitoring state, and as the stop mound, the shoulder-shaped object detected in the backward monitoring state.

Figure 11:
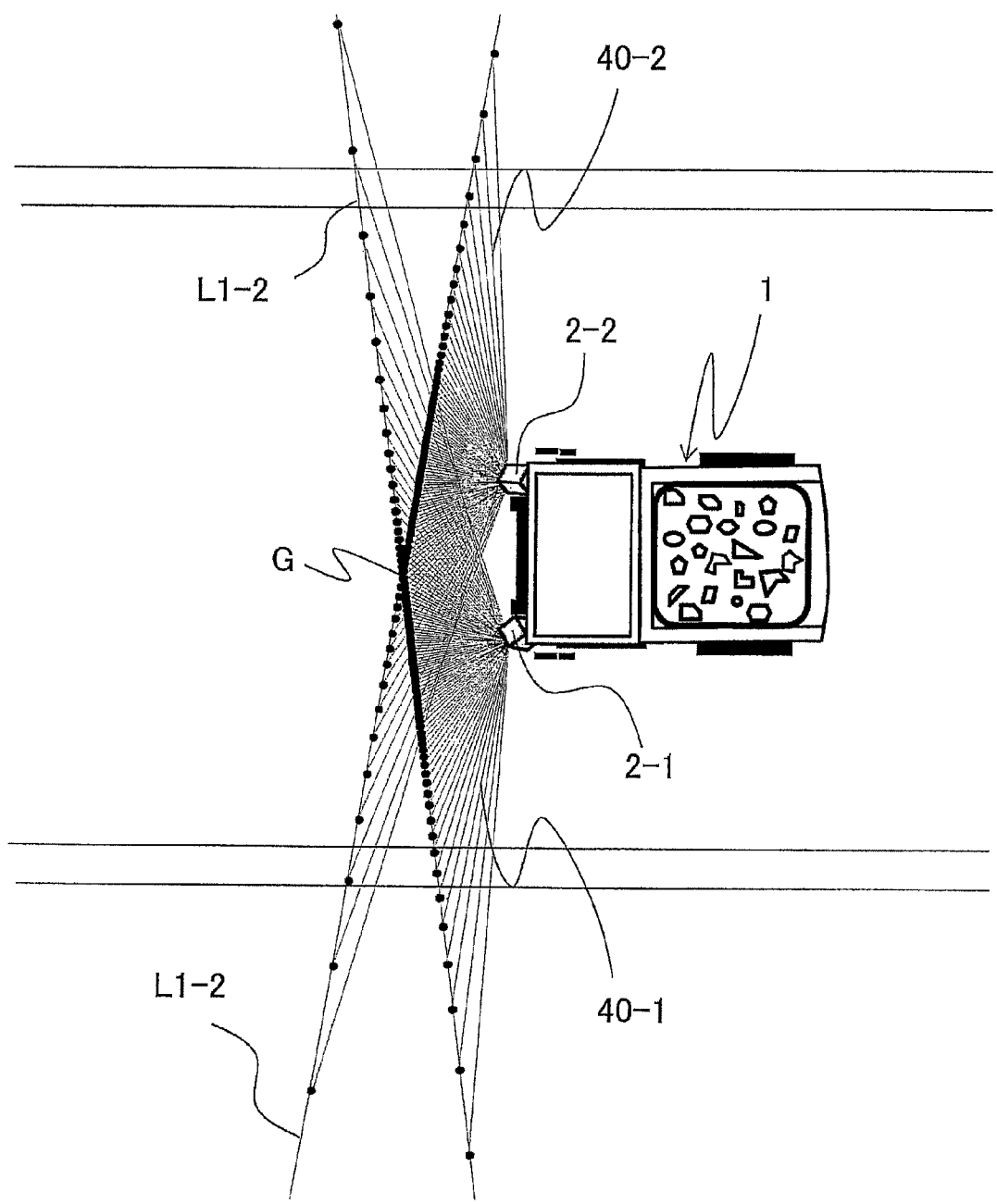
FIG. 11 is a diagram illustrating a state that scan planes intersect each other in the forward monitoring state.
Figure 12A:
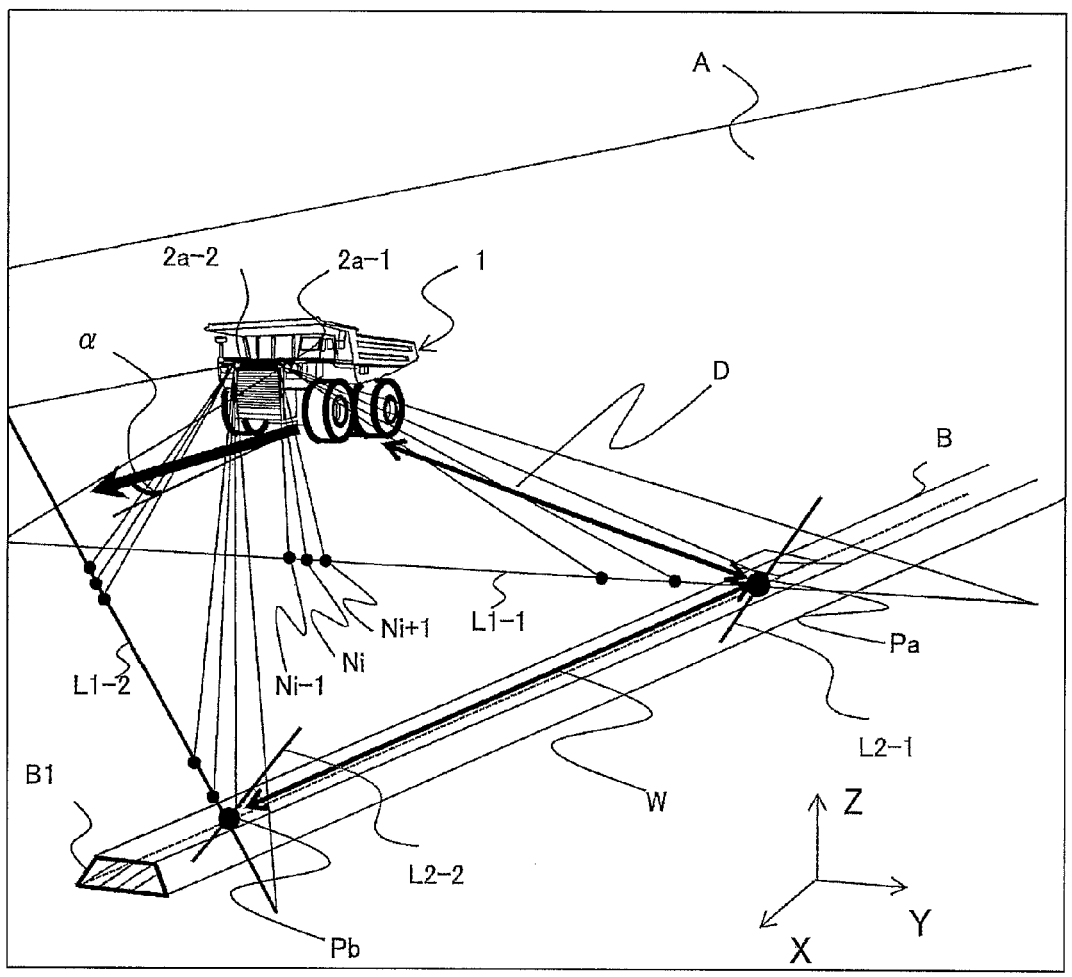
Figure 12B:
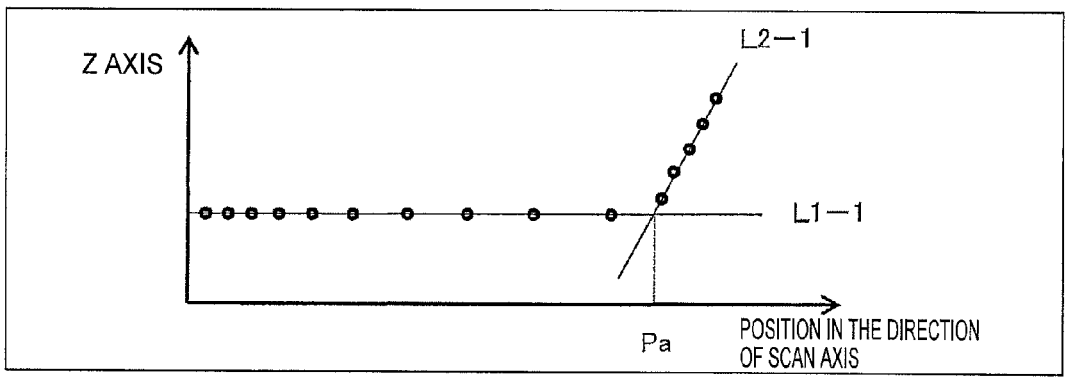
Figure 13A:
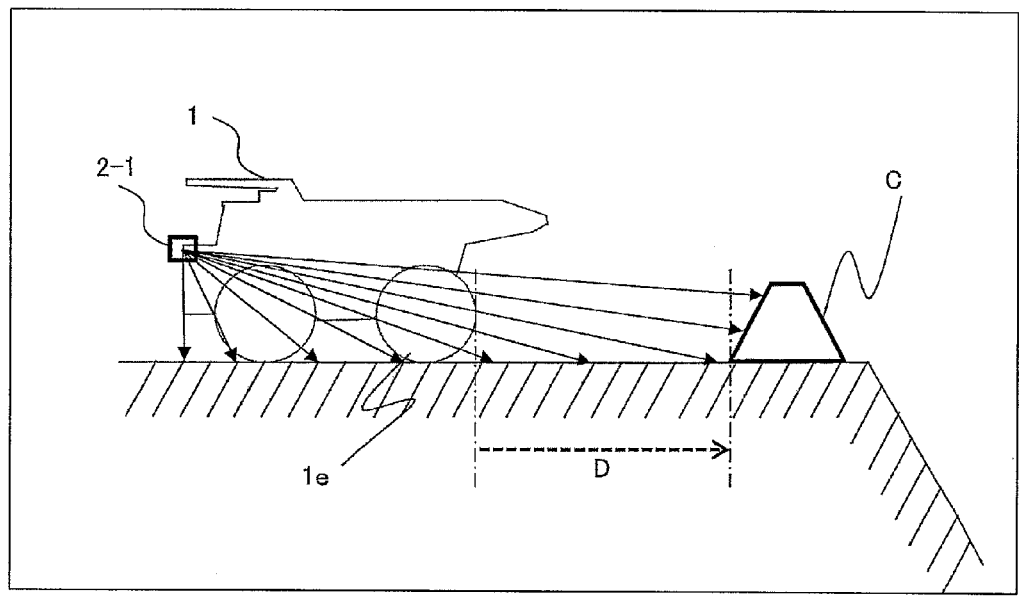
Figure 13B:
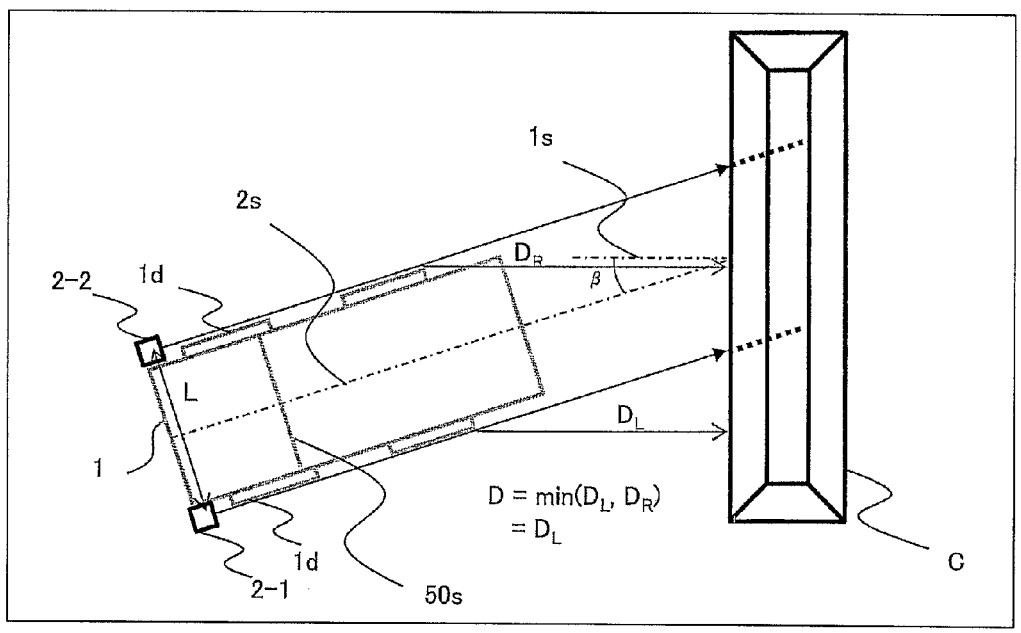

Referring next to FIG. 11 to FIG. 13B, a description will be made about peripheral object detection processing by the peripheral object detection system 100. FIG. 11 is a diagram illustrating a state that scan planes intersect each other in a forward monitoring state. FIGS. 12A and 12B are diagrams illustrating processing in the forward monitoring state, in which FIG. 12A shows a row of measuring points as illustrative measurement positions and FIG. 12B illustrates detection processing of the shoulder. FIGS. 13A and 13B are diagrams illustrating processing in the backward monitoring state, in which FIG. 13A shows the illustrative positions of measuring points and FIG. 12B illustrates detection processing of the stop mound.

FIG. 11 illustrates examples of the positions of the scan planes 40-1,40-2 in the forward monitoring state. In this embodiment, the scan planes 40-1,40-2 are allowed to intersect at a point G. Described in more detail, as illustrated in FIG. 12A, a point (measuring point) where a laser beam irradiated from the laser irradiation and reception module $2a$-1 of the unmanned dump truck 1 intersects the road surface A is indicated by N. When the laser beam is scanned, the measuring point shifts in position in such an order as Ni−1, Ni and Ni+1. A line that connects these measuring points is shown as a measuring line L1-1. On the other hand, a line that connects measuring points formed on a sloped surface B1 of the shoulder B is shown as a measuring line L2-1. Similarly, a line that connects points (measuring points), where laser beams irradiated from the laser irradiation and reception module $2a$-2 intersect the road surface A, is shown as a measuring line L1-2, and a line that connects measuring points (measuring points), where the laser beams irradiated from the laser irradiation and reception module $2a$-2 intersect the sloped surface B1 of the shoulder B, is shown as a measuring line L2-2.

As illustrated in FIG. 12A and FIG. 12B, upon detection of the position of the shoulder, the surrounding object computing unit $21b$ determines an intersecting point Pa of the measuring lines L1-1 and L2-1 and an intersecting point Pb of the measuring lines L1-2 and L2-2, and then determines a shoulder position w by connecting these intersecting points Pa and Pb.

FIGS. 13A and 13B are schematic diagrams for describing a backward detection by the peripheral object detection system 100 of the unmanned dump truck 1. FIG. 13A is a side view of the unmanned dump truck 1, and FIG. 13B is a top view of the unmanned dump truck 1. FIGS. 13A and 13B illustrate how the unmanned dump truck 1 moves backward while detecting the stop mound C at the dumping site. A dashed arrow in FIG. 13A shows how laser beams are irradiated to the target object (stop mound), and designation D indicates the distance from a rear end part of one of the rear wheels $1e$ to the stop mound C. FIG. 13B illustrates parameters to be used upon detection of the stop mound C, and their details will be described subsequently herein.

Figure 14:
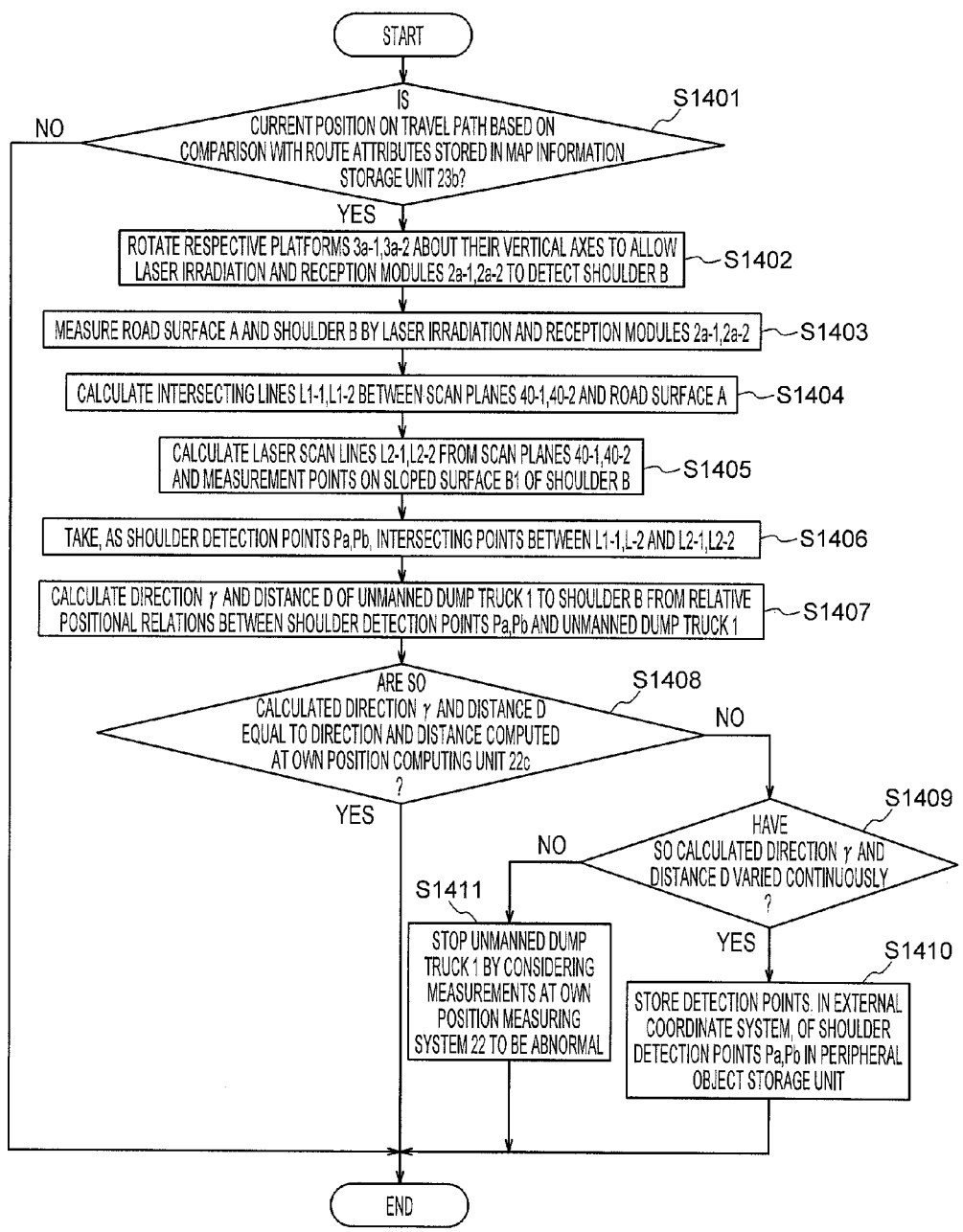
FIG. 14 is a flow chart illustrating a flow of processing in the forward monitoring state.
Figure 15:
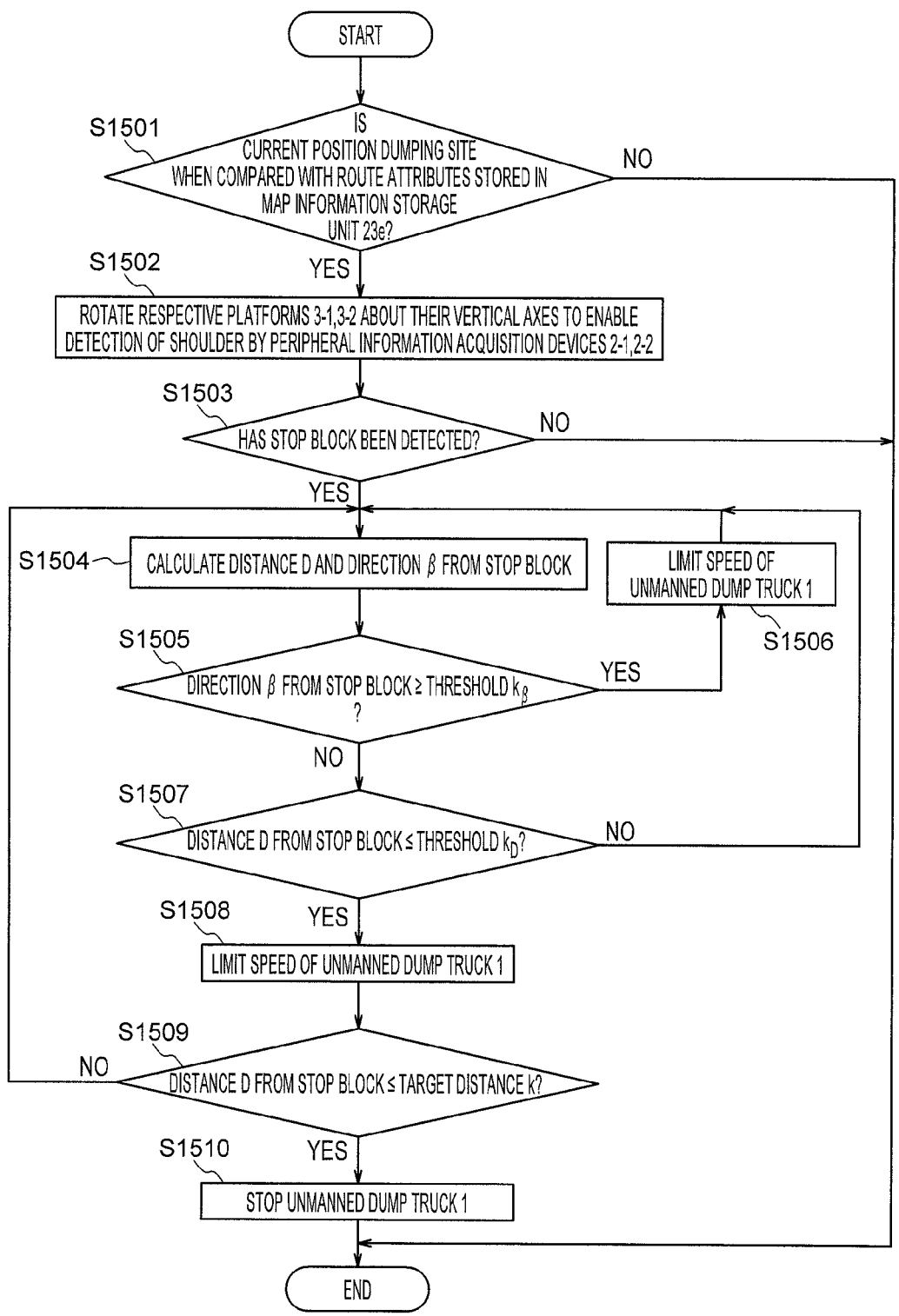
FIG. 15 is a flow chart illustrating a flow of processing in the backward monitoring state.

Referring next to FIG. 14 and FIG. 15, a description will be made about flows of forward and backward monitoring processing. FIG. 14 is a flowchart illustrating the flow of the processing in the forward monitoring state. FIG. 15 is a flow chart illustrating the flow of the processing in the backward monitoring state.

As illustrated in FIG. 14, in the forward monitoring state, the own position computing unit $22c$ first compares the current position of the unmanned dump truck 1 with the route attributes contained in the map information stored in the map information storage unit $23b$. If the current position is determined to be on the travel path (S1401), information that represents the results of the determination is outputted to the detecting range control device $3c$. Based on the information, the detecting range control device $3c$ controls the rotary drive devices $3b$ to rotate the platforms $3a$ about their vertical axes, respectively, such that their detection ranges are directed forward (S1402).

The left and right, laser irradiation and reception modules $2a$-1,$2a$-2 measure the road surface A and shoulder B, and acquire distance measurement data of these road surface A and shoulder B (S1403).

As illustrated in FIG. 11A, based on the distance measurement data obtained in S1403, the peripheral object computing unit $21b$ calculates the intersecting lines L1-1, L1-2 where the scan planes 40-1,40-2 by the respective laser irradiation and reception modules $2a$-1,$2a$-2 and the road surface A intersect each other (S1404).

From the measuring points on the sloped surface B1 of the shoulder B in the distance measurement data acquired from the LIDAR sensors 2-1,2-2, the peripheral object computing unit $21b$ calculates the laser scan lines L2-1,L2-2 which are the intersecting lines of the scan planes 40-1,40-2 and the sloped surface B1 of the shoulder B (see FIG. 12A).

Subsequently, the peripheral object computing unit 21b determines the intersecting points between the intersecting lines L1-1,L1-2 calculated in S1404 and the laser scan lines L2-1,L2-2 calculated in S1405. These intersecting points correspond to shoulder detection points P(Pa,Pb) as shoulder measuring points (S1406). In other words, as illustrated in FIG. 12B, the peripheral object computing unit 21b determines, as the shoulder detection point Pa, the point where the intersecting line L1-1 and the laser scan line L2-1 intersect each other. In addition, the peripheral object computing unit 21b determines, as the shoulder detection point Pb, the point where the intersecting line L1-2 and the laser scan line L2-2 intersect each other.

Further, the peripheral object computing unit 21b determines the shoulder position w based on the shoulder detection points Pa,Pb, and compares the shape of the shoulder at the current position with the reference information stored in the reference information storage unit 21a to determine a relative positional relation. Based on the results of the comparison, the peripheral object computing unit 21b then calculates the direction γ of the unmanned dump truck 1 to the shoulder B and its distance D to the shoulder B (S1407). The calculation results are outputted to the vehicle control unit 23a.

On the other hand, relative to the own position estimated based on the results of rotational speed as measured at the wheel speed information acquisition unit 22a and the results of steering angle as measured at the steering angle information acquisition unit 22b, the own position computing unit 22c performs, based on the information from the own position correction unit 22d, an estimation of the own position by correcting the traveling speed of the unmanned dump truck 1, the angular velocity of one of the front wheels 1d, and the position and posture of the unmanned dump truck 1 in the coordinate system fixed on the ground. The estimation results are outputted to the vehicle control unit 23a. The vehicle control unit 23a compares the estimation results with the direction 7 and distance D calculated in S1407, and determines whether or not they are equal to each other (S1408).

If the vehicle control unit 23a determines that the direction and distance determined at the own position computing unit 22c in S1408 are equal to the direction γ and distance D calculated in S1407 (S1408/Yes), the shoulder detection processing is ended. If determined to be negative in S1408 (S1408/No), on the other hand, it is determined whether or not the direction γ and distance D calculated in S1407 are varying continuously in predetermined ranges (S1409).

If the vehicle control unit 23a determines in step 1409 that the direction γ and distance D calculated by S1407 are varying continuously in the predetermined ranges (S1409/Yes), the detection positions, in an external coordinate system, of the shoulder detection points Pa,Pb determined in step 1406 are calculated at the peripheral object computing unit 21b, and the information so calculated is stored in an unillustrated peripheral object storage unit (S1410). If the direction γ and distance D calculated by the vehicle control unit 23a in S1407 are determined not to be varying continuously in the predetermined ranges but to be discontinuous (No) (S1409/No), on the other hand, there is a potential problem that some trouble has arisen in the measurement at the own position measuring unit 22, specifically in the computation of the position and posture of the unmanned dump truck 1 at the own position computing unit 22c. Therefore, the vehicle control unit 23a controls the braking system 24a and drive torque limiting unit 24b to stop the traveling of the unmanned dump truck 1, in other words, to stop the unmanned dump truck 1 (S1411), and the processing is ended.

Referring next to FIG. 15, a description will be made about processing for the detection of a peripheral object when the stop mound behind the unmanned dump truck 1 is selected as the peripheral object, in other words, as a target object.

As illustrated in FIG. 15, if the current position of the unmanned dump truck 1 is determined to be at the dumping site through a comparison between the current position of the unmanned dump truck 1 as calculated by the own position computing unit 22c and the route attributes contained in the map information stored in the map information storage unit 23b (S1501/Yes), the detecting range control device 3c drives and controls the rotary drive devices 3b to rotate the platforms 3a. Their rotation at this time is in such a direction that the detecting ranges of the left and right, laser irradiation and reception modules 2a-1,2a-2 are directed backward (S1502).

When the peripheral object computing system 21 detects the stop mound (S1503/Yes), the following processing is performed. The peripheral object computing unit 21b calculates the distances DL, DR (see FIG. 13B) from the left and right, rear wheels to the stop mound based on the results acquired from the peripheral information acquisition devices 2-1,2-2, and then acquires the smaller one of DL and DR as the distance D to the unmanned dump truck 1 (S1504).

Using the distance L between the laser emitting surfaces of the LIDAR sensors 2-1,2-2 (see FIG. 13B), the peripheral object computing unit 21b also calculates the direction β of the unmanned dump truck 1, as viewed from the stop mound, in accordance with the following formula (1) (S1505).

$$\beta = \sin^{-1}(DR-DL)/L \qquad (1)$$

Here, it is to be noted that in FIG. 13B, β is defined to be positive in a counterclockwise direction. It is also to be noted that β is the angle of the unmanned dump truck, which indicates the angle formed between a plane 1s perpendicular to the length direction of the stop mound C (horizontal direction) and a plane 2s perpendicular to an axle 50s that connects together the left and right, front wheels 1d of the unmanned dump truck 1.

The peripheral object computing unit 21b determines whether or not the direction β obtained in S1504 is not smaller than a certain threshold $k_\beta$ (S1505). If the direction β obtained in S1504 is not smaller than the certain threshold $k_\beta$ (S1505/Yes), this indicates that the unmanned dump truck 1 is moving diagonally backward with respect to the stop mound. The vehicle control unit 23a, therefore, limits the speed of the unmanned dump truck 1 (S1506). As a consequence, time sufficient to correct the direction of the unmanned dump truck 1 is secured.

If the direction β obtained in S1504 is smaller than the certain threshold $k_\beta$ (S1505/No), the peripheral object computing unit 21b determines whether or not the distance D obtained in S1504 is not greater than another certain threshold $k_D$ (S1507).

If the distance D is not greater than the certain threshold $k_D$ (S1507/Yes), this indicates that the unmanned dump truck 1 is closer to the stop mound. The Vehicle control unit 23a, therefore, limits the speed of the unmanned dump truck 1 (S1508). As a consequence, the unmanned dump truck 1 can be stopped safely.

The vehicle control unit 23a next determines whether or not the distance D obtained in S1504 is not greater than a target distance k (S1509). Here, the target distance k is smaller than the threshold $k_D$. If the unmanned dump truck 1 has moved still closer toward the stop mound and the distance D obtained in S1504 has become not greater than the target distance k (S1509/Yes), the vehicle control unit 23a stops the unmanned dump truck 1 (S1510), and the processing is ended. If determined to be negative in S1507 or S1509, the flow returns to S1504. If determined to be negative in S1501 or S1503, on the other hand, the backward monitoring processing is ended.

With reference to FIG. 16, a description will next be made about processing for autonomous traveling by the peripheral object detection system 100. FIG. 16 is a flow chart illustrating processing for autonomous traveling of the unmanned dump truck.

The vehicle control unit 23a acquires the own position information of the unmanned dump truck 1 from the own position measuring unit 22 (S1601). With reference to the map information stored in the map information storage unit 23b, the vehicle control unit 23a then calculates the direction of the unmanned dump truck 1 to the stop mound C as a peripheral object and the distance of the unmanned dump truck 1 to the peripheral object based on the information on the road width of the road surface A in the map information and the own position information obtained in S1601 (S1602).

Subsequently, the vehicle control unit 23a acquires information on the direction β of the unmanned dump truck 1 to the peripheral object and the distance D from the unmanned dump truck 1 to the peripheral object (S1603).

The vehicle control unit 23a compares the direction and distance calculated in S1602 with the direction 3 and distance D obtained in S1603, and determines whether or not the thus-obtained direction β and distance D are equal to the own position information (direction and distance) computed at the own position computing unit 22c (S1604).

If the direction β and distance D so obtained are determined in S1604 to be different from the direction and distance computed at the own position computing unit 22c (S1604/No), a trouble is assumed to have arisen in the measurement at the own position measuring unit 22, specifically in the computation of the position and posture of the unmanned dump truck 1 at the own position computing unit 22c. Therefore, the vehicle control unit 23a controls the braking system 24a and drive torque limiting unit 24b to stop the unmanned dump truck 1 (S1605).

If the direction β and distance D so obtained are determined in S1604 to be equal to the direction and distance computed at the own position computing unit 22c (S1604/Yes), the vehicle control unit 23a acquires the route information on the route path in the map information stored in the map information storage unit 23b (S1606).

The vehicle control unit 23a then compares the thus-acquired route information on the route path in the map information with the own position obtained in S1601. Based on an offset between the route information and the own position, the vehicle control unit 23a controls the steering angle control unit 24c, the drive torque limiting unit 24b and the like as needed, whereby the travel position of the unmanned dump truck 1 is controlled to a predetermined travel position (S1607).

In addition to the above-described respective processing, the platforms 3a may also be rotated for the detection of an operation failure due to a malfunction or the like at the earliest possible opportunity while the unmanned dump truck 1 is at stop, for example, at the time of parking or loading, at the time of dumping, or at the time of a temporary stop and the recognition of its peripheral environment is not needed.

As has been described above, the above-described peripheral object detection system 100 according to the first embodiment allows the respective LIDAR sensors 2-1,2-2, which are arranged on the front section of the vehicle main body 1a, to perform forward monitoring and backward monitoring by directing the detecting ranges of the LIDAR sensors 2-1,2-2 forward or backward. As the respective laser irradiation and reception modules can monitor both of a forward area and a backward area, forward and backward monitoring can be performed at low costs.

In this embodiment, the two LIDAR sensors 2-1,2-2 are arranged on the left and right sides of the front section, as viewed in the traveling direction, of the vehicle main body 1a, respectively, and the direction and distance of the vehicle body are measured using the distance measurement data acquired by these LIDAR sensors. Compared with the use of a single LIDAR sensor alone, it is, therefore, possible to also consider peripheral information in combination or to perform complementarity, and therefore to improve the accuracy of measurements. As a result, it is possible to improve the accuracy of detection of a shoulder by the peripheral object computing unit 21b and to perform the autonomous traveling of unmanned dump trucks more appropriately with good accuracy.

Figure 17A:
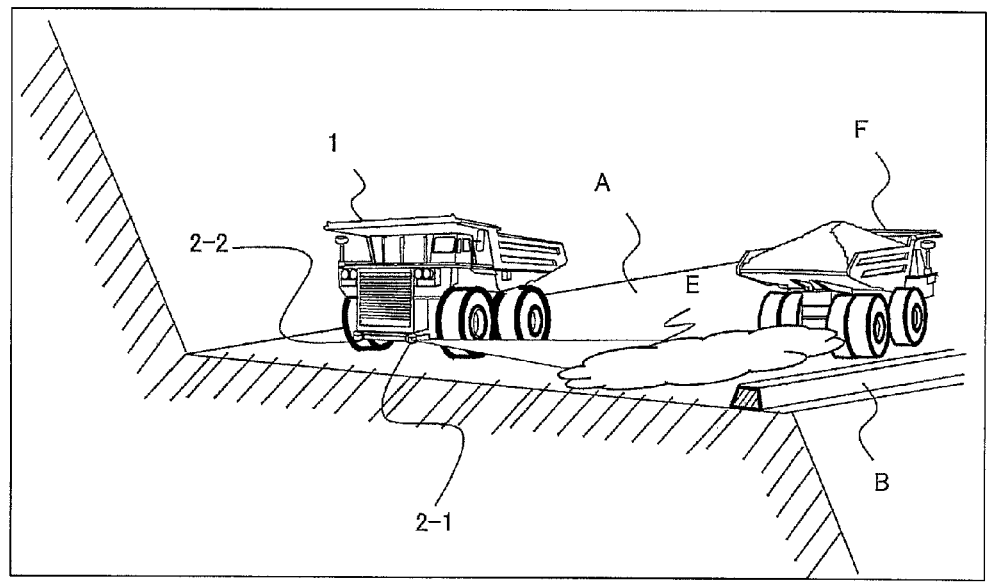
Figure 17B:
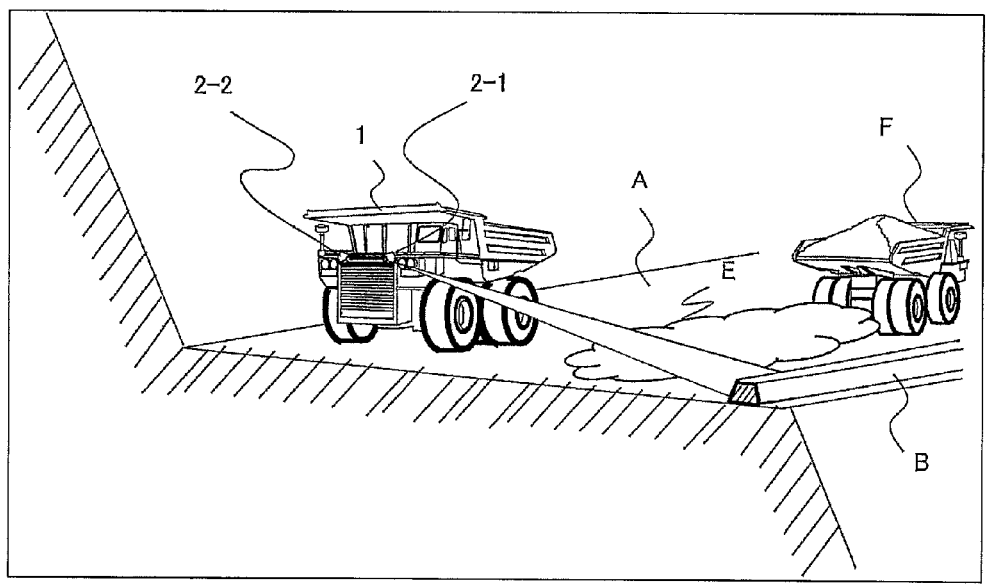

FIGS. 17A and 17B are diagrams illustrating differences in effects depending on the fixing positions of the LIDAR sensors 2-1,2-2 on the unmanned dump truck 1, in which FIG. 17A shows a situation where the LIDAR sensors are fixed at positions lower than the height position of the front wheels 1d and FIG. 17B depicts another situation where the LIDAR sensors 2-1,2-2 are fixed at positions higher than the height position of the front wheels 1d.

If the travel path is dry dirt, dust E rises by rotation of the front wheels 1d or rear wheels 1e (see FIG. 1) of the unmanned dump truck 1 when the unmanned dump truck 1 travels on the travel path. There is, accordingly, a potential problem that as illustrated in FIGS. 17A and 17B, the dust E risen by an oncoming vehicle F may drift between the unmanned dump truck 1 and the shoulder B. If the LIDAR sensors 2-1,2-2 are arranged on lower parts of the unmanned dump truck 1 in this situation as illustrated in FIG. 17A, the dust E enters between the LIDAR sensors 2-1,2-2 and the shoulder B. Therefore, the LIDAR sensors cannot accurately detect the distance to the shoulder B, and moreover the apertures 2c (see FIG. 2) of the LIDAR sensors 2-1,2-2 are fouled with the dust E, leading to a potential problem that the distance to the shoulder B may not be detected.

In the unmanned dump truck 1 with the above-described peripheral object detection system according to the first embodiment being mounted thereon, the LIDAR sensors 2-1,2-2 are hence arranged at the positions higher than the upper end parts of the front wheels 1d of the unmanned dump truck 1 such that the distance to the shoulder B can be detected from above the dust E, which has risen over the road surface A of the travel path, while reducing the frequency of deposition of the dust E onto the detection apertures 2c of the LIDAR sensors 2-1,2-2. As a result, even if the dust E rises at the time of traveling of not only the oncoming vehicle F but also the own vehicle or one or more preceding vehicles, the distance to the shoulder B can be detected by the LIDAR sensors 2-1,2-2 from above the risen dust E, thereby further ensuring the detection of the shoulder B by the LIDAR sensors 2-1,2-2. At the same time, it is also possible to curtail a reduction in detection accuracy because the frequency of deposition of the dust E onto the detection apertures 2c of the LIDAR sensors 2-1,2-2 can be reduced.

Further, the positions of arrangement of the LIDAR sensors 2-1,2-2 are readily accessible from the upper deck 1f, specifically on the lower side of the upper deck if (see FIG. 1). Therefore, the LIDAR sensors 2-1,2-2 can be inspected or otherwise checked from the upper deck 1f, and the maintainability of these LIDAR sensors 2-1,2-2 is ensured. Further, the two LIDAR sensors 2-1,2-2 are arranged at the same height position to provide detection results with symmetry. Compared with the case that these LIDAR sensors 2-1,2-2 are arranged at different height positions, it is, therefore, possible to eliminate a difference in resolution capability on the road surface A and to reduce detection errors.

Figure 18A:
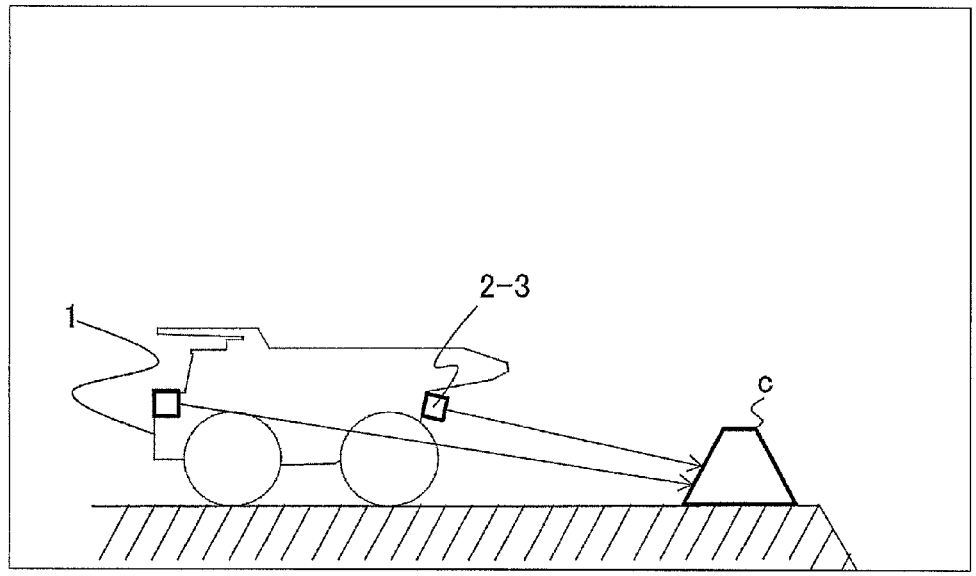
Figure 18B:
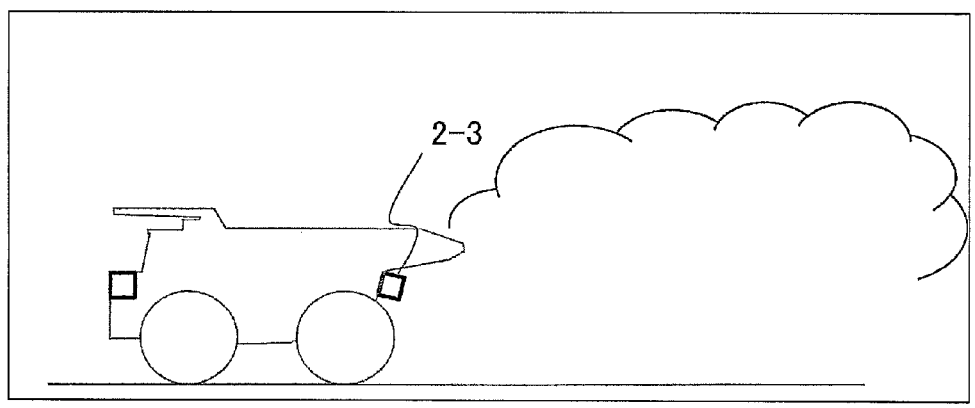

Referring next to FIGS. 18A and 18B, a description will be made of a comparative example in which a LIDAR sensor 2-3 is arranged on a rear part of an unmanned dump truck 1. FIGS. 18A and 18B are explanatory diagrams illustrating the comparative example with the LIDAR sensor 2-3 arranged on the rear part of the unmanned dump truck 1, in which FIG. 18A is a side view showing a state that the LIDAR sensor 2-3 is arranged on the rear part of the unmanned dump truck 1 and FIG. 18B is a side view depicting a state that dust E has risen.

If a travel path for the unmanned dump truck 1 is dry dirt, dust rises by rotation of its wheels, and under the effects of braking during a backward movement, a wind direction and the like, dust may drift around the unmanned dump truck 1. In addition, dust may rise behind the unmanned dump truck 1 due to dumping work by other vehicles. If the LIDAR sensor 2-3 is arranged on the rear part of the unmanned dump truck 1, for example, on a rear part of a vessel, the dust E risen by the own vehicle may foul a detection aperture of the LIDAR sensor 2-3 as illustrated in FIG. 18B. The distance to a stop mound C may not be correctly measured accordingly.

In the first embodiment of the present invention, on the other hand, the LIDAR sensors are fixed on the lower side of the upper deck 1f of the unmanned dump truck 1. This lower side is apart from the rear wheels. As a consequence, it is possible to reduce the frequency of deposition of dust, which is risen by the own vehicle, onto the detection apertures of the LIDAR sensors.

<Second Embodiment>

Figure 19:
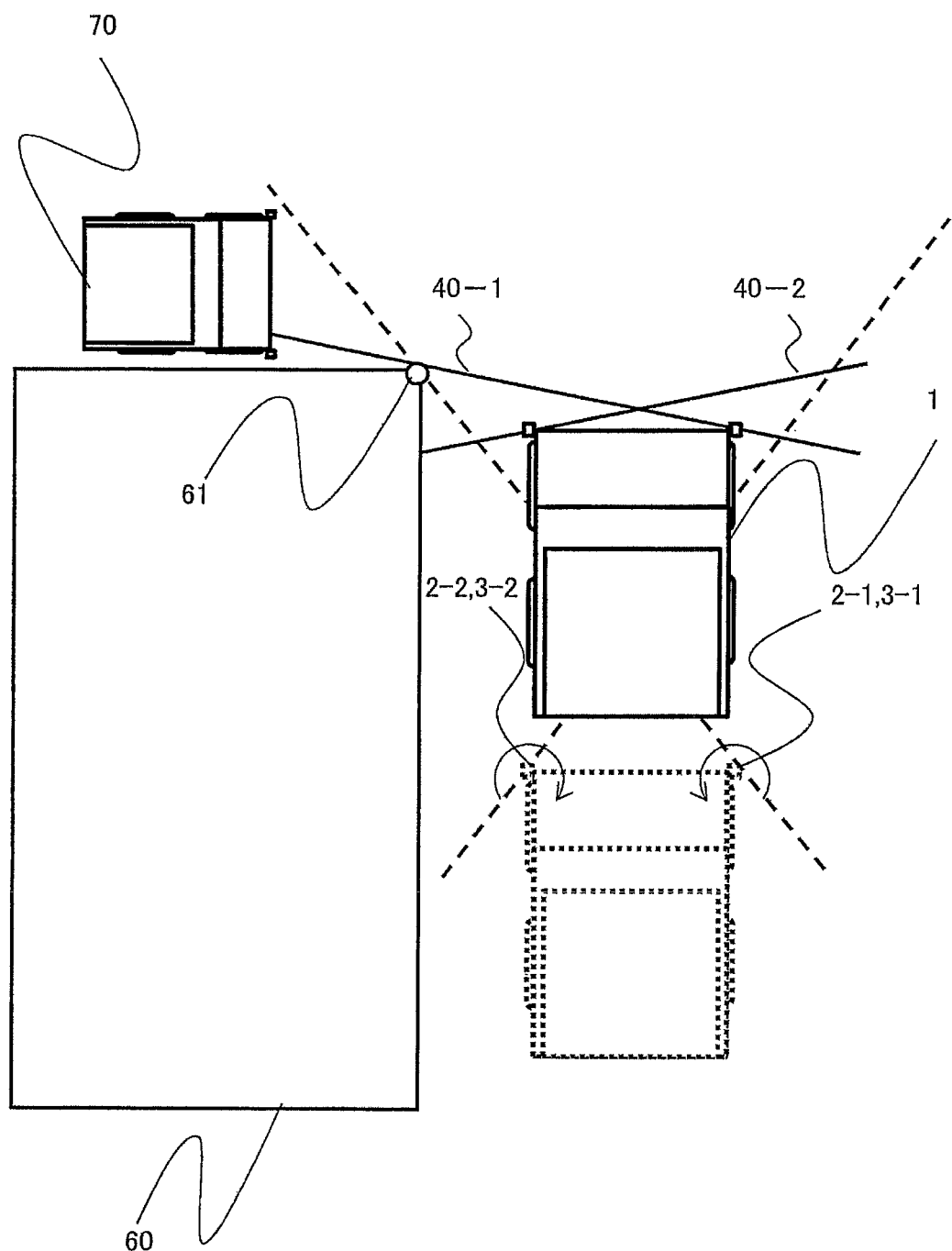
FIG. 19 is a schematic plan view illustrating detecting ranges of laser irradiation and reception modules in a peripheral object detection system according to a second embodiment of the present invention as fixed on an unmanned dump truck.

With reference to FIG. 19, a description will hereinafter be made about a second embodiment of the present invention. FIG. 19 is a schematic plan view illustrating the detecting ranges (scanplanes 40-1,40-2) of LIDAR sensors 2 in a peripheral object detection system according to the second embodiment as mounted on an unmanned dump truck 1.

The second embodiment is different from the above-described first embodiment in that for the adjustment of the scan planes 40-1,40-2 of the LIDAR sensors 2-1,2-2, the platforms 3a-1,3a-2 are rotated according only to the time of switching of an area, such as the dumping site, travel path or the like, and the traveling speed in the first embodiment while the platforms 3a-1,3a-2 are rotated according to the steering angle in addition to the time of switching of the area and the traveling speed in the second embodiment. About the second embodiment, a description will hereinafter be made with reference to the functional block diagram of FIG. 7. In the second embodiment, the steering angle information acquisition unit 22b and the detecting range control device 3c are electrically connected to each other, and steering angle information is inputted from the steering angle information acquisition unit 22b to the detecting range control device 3c. Based on the steering angle information, the detecting range control device 3c then rotates the platforms 3a-1,3a-2 about their vertical axes.

As illustrated by way of example in FIG. 19, when the unmanned dump truck 1 comes close to an intersection of low visibility due to a building 60, the platforms 3a-1,3a-2 are rotated in the second embodiment such that the scan planes 40-1,40-2 extend in the vicinity of a corner 61 of the building 60 but are not blocked by the building 60. As a result, compared with the first embodiment in which the platforms are not rotated according to the steering angle, a crossing vehicle 70 can be detected earlier.

<Third Embodiment>

Figure 20:
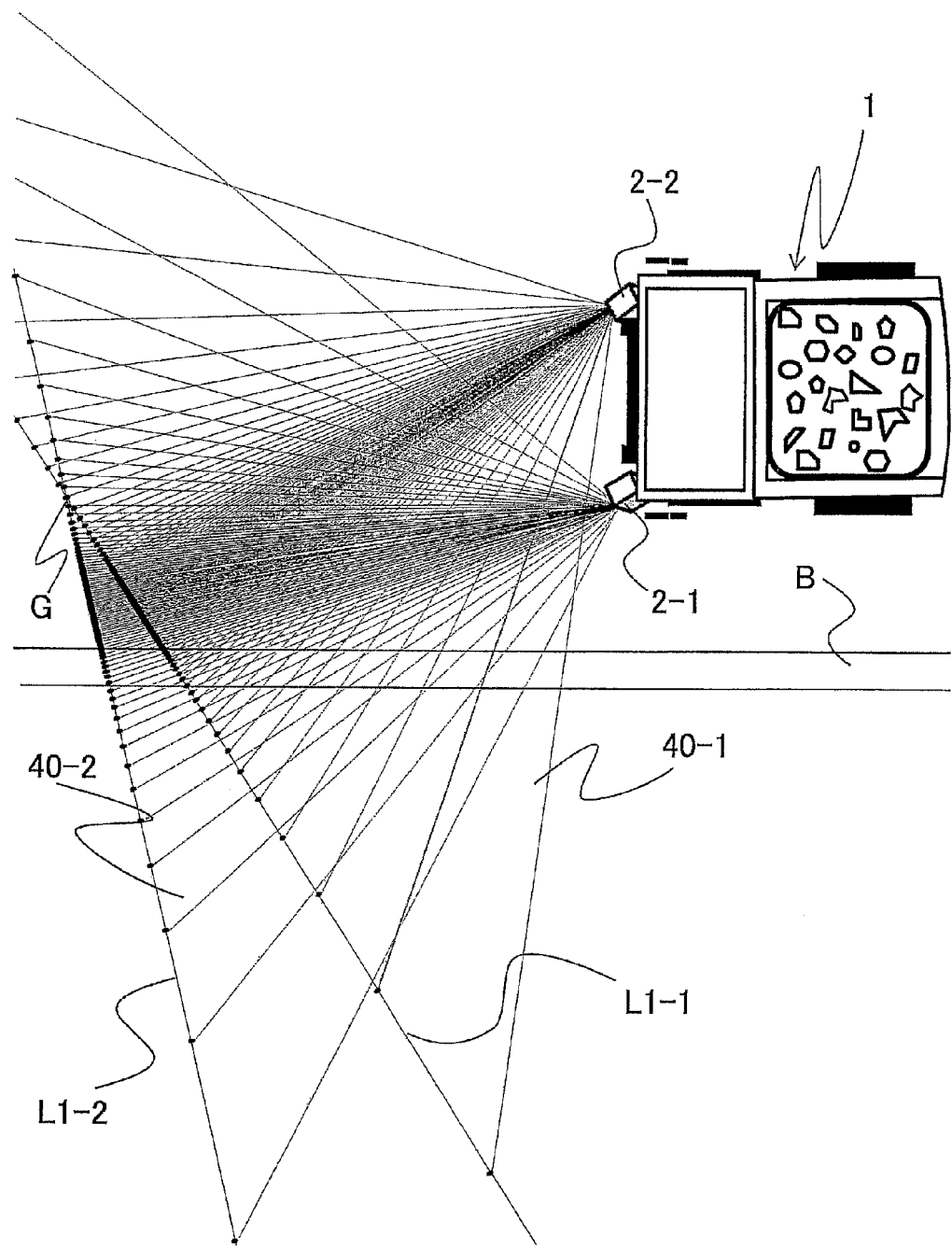
FIG. 20 is a diagram illustrating a point of intersection of scan planes in a forward monitoring state in a third embodiment.
Figure 21:
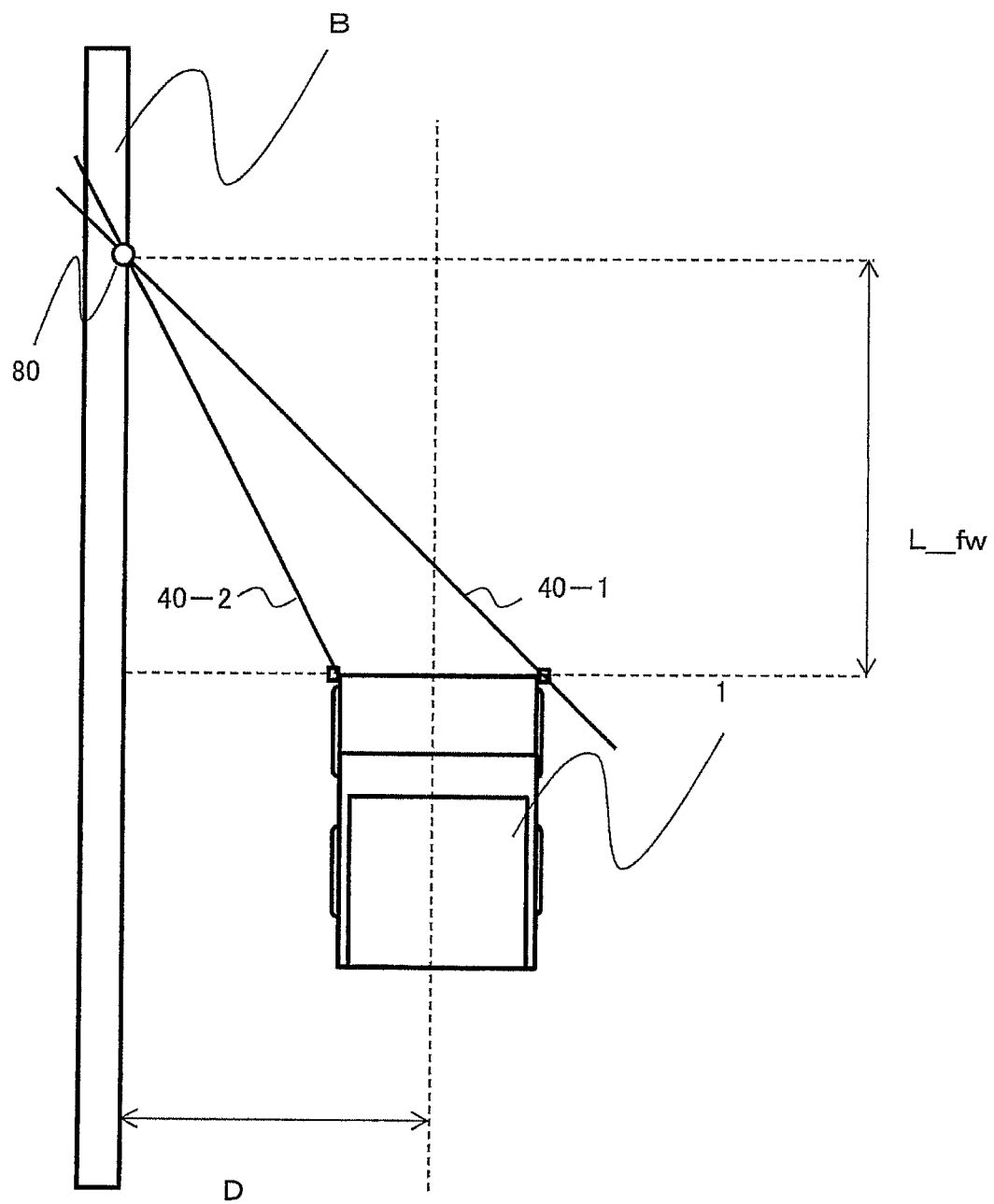
FIG. 21 is a schematic plan view illustrating scan planes by laser irradiation and reception modules in a peripheral object detection system according to the third embodiment of the present invention as mounted on an unmanned dump truck.

With reference to FIGS. 20 and 21, a description will hereinafter be made about a third embodiment of the present invention. FIG. 20 is a diagram illustrating a position of intersection of scan planes in a forward monitoring state in the third embodiment. FIG. 21 is a schematic plan view illustrating scan planes by laser irradiation and reception modules in a peripheral object detection system according to the third embodiment of the present invention as mounted on an unmanned dump truck. The third embodiment is different from the above-described first embodiment in that the scan planes 40-1,40-2 of the LIDAR sensors 2-1,2-2 are allowed to intersect each other in the area forward of the unmanned dump truck 1 in the first embodiment while such scan planes 40-1,40-2 are allowed to intersect each other at a position diagonally forward of an unmanned dump truck 1 and closer to a shoulder B as illustrated in FIG. 20.

In the third embodiment, reference information is stored in the reference information storage unit 21a. In this reference information, the coordinates of nodes on the unmanned dump truck 1 on a travel path are correlated to the rotation angles of the platforms 3a-1,3a-2 at the coordinates of the nodes. As illustrated in FIG. 21, these rotation angles are needed to rotate the platforms such that the scan planes 40-1,40-2 intersect each other on the shoulder B at a point 80 apart leftward by a distance D in the direction of the width of the road and forward by a distance L_fw in the traveling direction from each position (node coordinates) of the unmanned dump truck 1.

Compared with the first embodiment, this third embodiment can detect the shape of the shoulder B in more detail, and can improve the accuracy of measurement of the distance D to the shoulder B.

The above-described respective embodiments shall not limit the present invention, and diverse variations and modifications are possible within a scope not departing from the spirit of the present invention. For example, two LIDAR sensors are arranged in each embodiment described above. Even in a case that only one LIDAR sensor is provided, however, the application of the present invention allows to monitor both a forward area and a backward area with the single LIDAR monitor, thereby making it possible to perform peripheral monitoring in both the forward and backward directions at low costs compared with a case that LIDAR sensors are applied to both front and rear parts of an unmanned dump truck.

Figure 22:
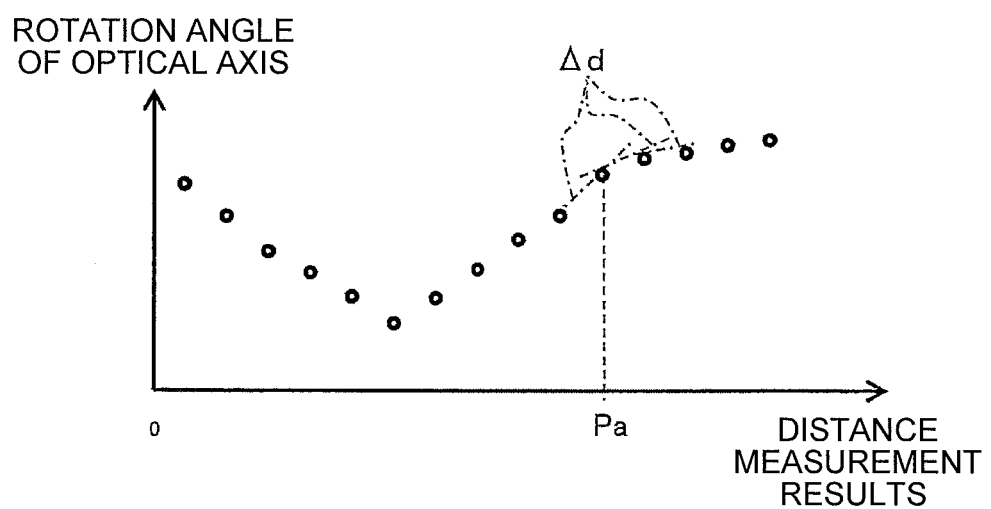
FIG. 22 is a diagram illustrating a profile that represents the results of the measurement of distances corresponding to rotation angles of an optical axis.

Upon detection of a shoulder, the measuring lines L1-1, L2-1 and the measuring lines L1-2,L2-2 were calculated, followed by the determination of their intersecting points Pa,Pb, respectively (see FIG. 12A). As an alternative, with respect to each LIDAR sensor, for example, the LIDAR sensor 2a-1, rotation angles of its optical axis and the results of measurement of distances (the distances between the LIDAR sensor 2a-1 and respective measuring points) at the rotation angles may be determined in a correlated manner, and the intersecting point Pa may then be determined based on variations in distance change rate. Illustrated in FIG. 22 is a profile that represents the results of the measurement of distances corresponding to the rotation angles of the optical axis. As the optical axis of the LIDAR sensor 2a-1 is scanned in the order of Ni−1, Ni and Ni+1 as illustrated in FIG. 12A, the measuring point moves progressively closer to the unmanned dump truck 1 (the distance between them indicates a decreasing function). After having moved closest to the unmanned dump truck 1, the measuring point moves away from the unmanned dump truck 1 (the distance between them indicates an increasing function). Upon irradiation of a laser beam onto the sloped surface B1 of the shoulder B, the distance from the unmanned dump truck 1 to the intersecting point with the optical axis (the measuring point) decreases with the height of the intersecting point (measuring point) from the road surface A, because the sloped surface B1 of the shoulder B is higher in the direction of the Z-axis than the road surface A. According to the profile of FIG. 22, the rate of increase in distance, therefore, becomes gentle after the irradiation point of laser has moved from the road surface A to the shoulder B. It is, therefore, possible to detect, as the intersecting point Pa, a point where the rate of increase in distance, Δd, is in the range of positive values and has decreased.

The invention claimed is:

1. A peripheral object detection system to be mounted on a vehicle, comprising:
 a first peripheral information acquisition device configured to be mounted on the vehicle and to acquire first distance information to an object to be detected and that exists around the vehicle;
 a second peripheral information acquisition device configured to be mounted on the vehicle along a lateral direction of a vehicle body of the vehicle and at an interval from the first peripheral information acquisition device and to acquire second distance information to the object to be defected;
 a detecting range switching mechanism configured to switch, toward an area forward or backward of the vehicle, a direction of a field of view of the first peripheral information acquisition device and a direction of a field of view of the second peripheral information acquisition device based on forward or back information that indicates whether the vehicle is moving in a forward direction or in a backward direction, and
 a peripheral object computing unit configured to detect a direction of the vehicle body with respect to the object to be detected based on the first distance information and the second distance information.

2. The peripheral object detection system according to claim 1, wherein the first and second peripheral information acquisition devices are arranged on opposite end portions, in the lateral direction of the vehicle body, on a front section of the vehicle, respectively, and extend outward beyond opposite outermost end faces of the vehicle, the opposite outermost end faces being located outermost in the lateral direction of the vehicle body, respectively.

3. A haulage vehicle comprising:
 a haulage vehicle main body,
 a first peripheral information acquisition device configured configured to be mounted on the haulage vehicle and to acquire first distance information to an object to be detected and that exists around the haulage vehicle;
 a second peripheral information acquisition device configured to be mounted on the haulage vehicle along a lateral direction of the haulage vehicle main body at an interval from the first peripheral information acquisition device and to acquire second distance information to the object to be detected;
 a detecting range switching mechanism configured to switch, toward an area forward or backward of the haulage vehicle, a direction of a field of view of the first peripheral information acquisition device and a direction of a field of view of the second peripheral information acquisition device based on forward or back information that indicates whether the haulage vehicle is moving in a forward direction or in a backward direction, and
 a peripheral object computing unit configured to detect a direction of the haulage vehicle main body with respect to the object to be detected based on the first distance information and the second distance information.

* * * * *